(12) United States Patent
Kido

(10) Patent No.: US 9,110,529 B2
(45) Date of Patent: Aug. 18, 2015

(54) DISPLAY APPARATUS

(75) Inventor: Kousuke Kido, Osaka (JP)

(73) Assignee: KYOCERA Corporation, Kyoto (JP)

( * ) Notice: Subject to any disclaimer, the term of this patent is extended or adjusted under 35 U.S.C. 154(b) by 136 days.

(21) Appl. No.: 13/818,958

(22) PCT Filed: Aug. 8, 2011

(86) PCT No.: PCT/JP2011/004491
§ 371 (c)(1),
(2), (4) Date: Feb. 25, 2013

(87) PCT Pub. No.: WO2012/026076
PCT Pub. Date: Mar. 1, 2012

(65) Prior Publication Data
US 2013/0154987 A1    Jun. 20, 2013

(30) Foreign Application Priority Data
Aug. 26, 2010    (JP) .................................. 2010-189940

(51) Int. Cl.
| | | |
|---|---|---|
| G06F 3/041 | (2006.01) | |
| G06F 3/01 | (2006.01) | |
| G06F 3/0488 | (2013.01) | |
| G06F 3/0484 | (2013.01) | |

(52) U.S. Cl.
CPC *G06F 3/041* (2013.01); *G06F 3/01* (2013.01); *G06F 3/016* (2013.01); *G06F 3/04842* (2013.01); *G06F 3/04883* (2013.01); *G06F 2203/014* (2013.01)

(58) Field of Classification Search
CPC ..... G06F 3/041; G06F 3/016; G06F 3/03547; G06F 3/0487; G06F 3/0488; G06F 3/04883; G06F 3/04886

USPC ................... 345/173, 174; 715/701, 702, 856
See application file for complete search history.

(56) References Cited

U.S. PATENT DOCUMENTS

| | | | |
|---|---|---|---|
| 6,747,631 B1 | 6/2004 | Sakamaki et al. | |
| 2009/0325645 A1* | 12/2009 | Bang et al. ..................... | 345/173 |
| 2012/0139844 A1* | 6/2012 | Ramstein et al. ............. | 345/173 |

FOREIGN PATENT DOCUMENTS

| | | |
|---|---|---|
| JP | 2002-259044 A | 9/2002 |
| JP | 2003-263271 A | 9/2003 |

(Continued)

OTHER PUBLICATIONS

An Office Action; "Notice of Reason for Rejection," issued by the Japanese Patent Office on Apr. 1, 2014, which corresponds to Japanese Patent Application No. 2010-189940 and is related to U.S. Appl. No. 13/818,958; with English language concise explanation.

(Continued)

*Primary Examiner* — Regina Liang
(74) *Attorney, Agent, or Firm* — Studebaker & Brackett PC

(57) ABSTRACT

An area selection operation of a character string is performed by touching the character string displayed on a display unit 1 via a touch panel unit 2 disposed on the display unit 1 by a finger and tracing the character string. When it is determined that the finger performing the area selection operation is positioned over a displayed character, character type information of the character at a contact position of the finger is determined. Then, when the contact position of the finger performing the selection operation moves from the character to a next character of the character string, a tactile sensation is provided based on information added to each of the characters. An end point of a selected area of the character string is set to a character for which the tactile sensation is provided immediately before detection of release of the finger.

8 Claims, 27 Drawing Sheets

(56) References Cited

FOREIGN PATENT DOCUMENTS

| | | |
|---|---|---|
| JP | 2005-077674 A | 3/2005 |
| JP | 2005-149491 A | 6/2005 |
| JP | 2007-316760 A | 12/2007 |
| JP | 2007316760 | * 12/2007 |

OTHER PUBLICATIONS

International Search Report; PCT/JP2011/004491; Sep. 6, 2011.

* cited by examiner

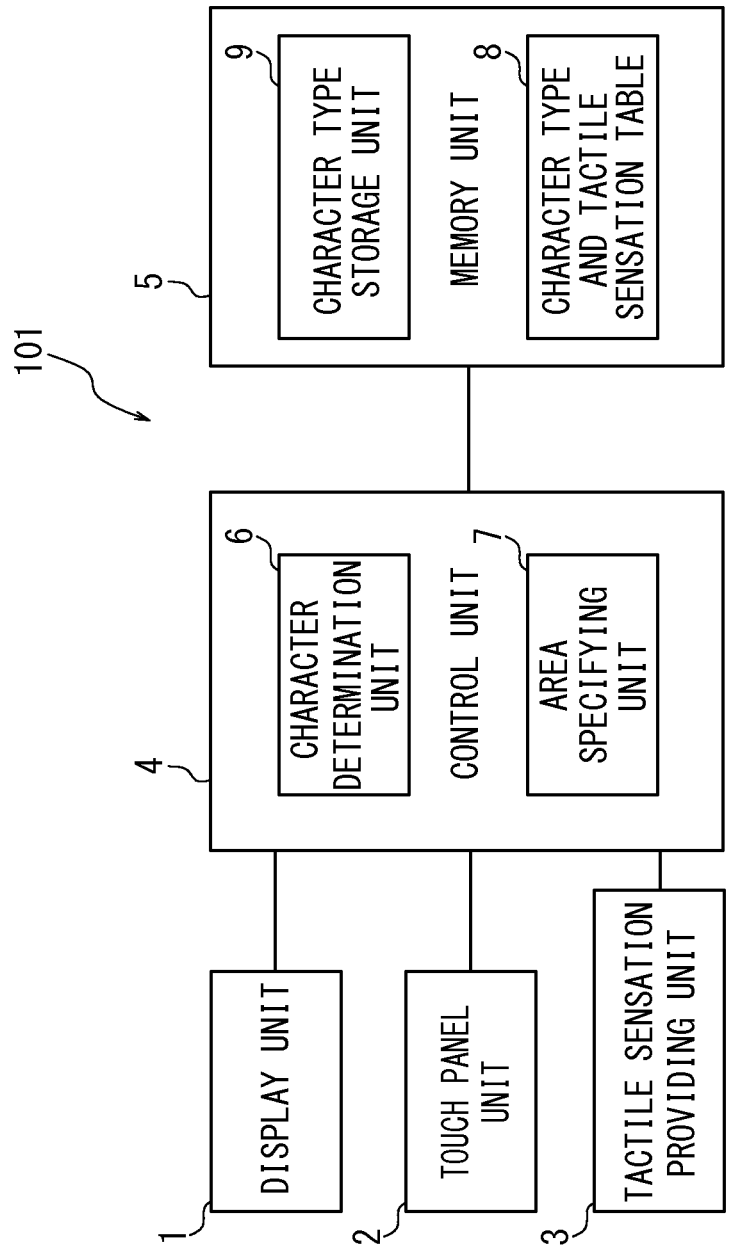

FIG. 2

| CHARACTER TYPE | TACTILE SENSATION |
|---|---|
| DOUBLE-BYTE KANJI CHARACTER | PATTERN A |
| SINGLE-BYTE KANJI CHARACTER | PATTERN B |
| DOUBLE-BYTE HIRAGANA CHARACTER | PATTERN C |
| SINGLE-BYTE HIRAGANA CHARACTER | PATTERN D |
| DOUBLE-BYTE KATAKANA CHARACTER | PATTERN E |
| SINGLE-BYTE KATAKANA CHARACTER | PATTERN F |
| DOUBLE-BYTE ALPHABET | PATTERN G |
| SINGLE-BYTE ALPHABET | PATTERN H |
| DOUBLE-BYTE DIGIT | PATTERN I |
| SINGLE-BYTE DIGIT | PATTERN J |
| DOUBLE-BYTE SYMBOL | PATTERN K |
| SINGLE-BYTE SYMBOL | PATTERN L |
| PUNCTUATION MARK | PATTERN M |
| PICTOGRAPH | PATTERN N |
| SPACE | PATTERN O |

FIG. 15

ZEN JUUGYOUIN NO BUSSIN RYOUMEN NO KOUHUKU WO
TUIKYUU SURU TO DOUJI NI ,

⇩ ANALYZE TEXT    CHARACTER BOUNDARY INFORMATION

| ZEN JUUGYOUIN | NO | BUSSIN RYOUMEN | NO | KOUHUKU | WO |
| TUIKYUU | SURU | TO | DOUJI | NI | , |

THROBBING TACTILE SENSATION ⇩

ZEN JUUGYOUIN NO BUSSIN RYOUMEN NO KOUHUKU WO
TUIKYUU SURU TO DOUJI NI,  — A

⇩

ZEN JUUGYOUIN NO BUSSIN RYOUMEN NO KOUHUKU WO
TUIKYUU SURU TO DOUJI NI,  — A

THROBBING TACTILE SENSATION ⇩ FINGER CONTACTS CHARACTER ADJACENT TO CHARACTER BOUNDARY INFORMATION

ZEN JUUGYOUIN NO BUSSIN RYOUMEN NO KOUHUKU WO
TUIKYUU SURU TO DOUJI NI,  — A

FIG. 18

ZEN JUUGYOUIN NO BUSSIN RYOUMEN NO KOUHUKU WO
TUIKYUU SURU TO DOUJI NI ,

⇩ ANALYZE TEXT     CHARACTER BOUNDARY INFORMATION

:ZEN JUUGYOUIN:NO:BUSSIN RYOUMEN:NO:KOUHUKU:WO:
TUIKYUU:SURU TO:DOUJI:NI:,:

⇩

ZEN JUUGYOUIN NO BUSSIN RYOUMEN NO KOUHUKU WO
TUIKYUU SURU TO DOUJI NI ,     ~A

⇩

ZEN JUUGYOUIN NO BUSSIN RYOUMEN NO KOUHUKU WO
TUIKYUU SURU TO DOUJI NI ,     ~A

THROBBING TACTILE SENSATION  ⇩  MOVES ACROSS BENT CHARACTER BOUNDARY INFORMATION

ZEN JUUGYOUIN NO BUSSIN RYOUMEN NO KOUHUKU WO
TUIKYUU SURU TO DOUJI NI ,     ~A

FIG. 20

ZEN JUUGYOUIN NO BUSSIN RYOUMEN NO KOUHUKU WO
TUIKYUU SURU TO DOUJI NI ,

⬇ ANALYZE TEXT   CHARACTER BOUNDARY INFORMATION

ZEN JUUGYOUIN NO BUSSIN RYOUMEN NO KOUHUKU WO
TUIKYUU SURU TO DOUJI NI ,

⬇

ZEN JUUGYOUIN NO BUSSIN RYOUMEN NO KOUHUKU WO
TUIKYUU SURU TO DOUJI NI , ~A

⬇

ZEN JUUGYOUIN NO BUSSIN RYOUMEN NO KOUHUKU WO
TUIKYUU SURU TO DOUJI NI , ~A

THROBBING TACTILE SENSATION   ⬇ MOVES ACROSS BENT CHARACTER BOUNDARY INFORMATION

ZEN JUUGYOUIN NO BUSSIN RYOUMEN NO KOUHUKU WO
TUIKYUU SURU TO DOUJI NI , ~A

FIG. 23

ZEN JUUGYOUIN NO BUSSIN RYOUMEN NO KOUHUKU WO
TUIKYUU SURU TO DOUJI NI ,

⬇ ANALYZE TEXT    CHARACTERS BELONGING
                  TO THE SAME CLAUSE

ZEN JUUGYOUIN NO BUSSIN RYOUMEN NO KOUHUKU WO
TUIKYUU SURU TO DOUJI NI ,

⬇

ZEN JUUGYOUIN NO BUSSIN RYOUMEN NO KOUHUKU WO
TUIKYUU SURU TO DOUJI NI ,
A

⬇

ZEN JUUGYOUIN NO BUSSIN RYOUMEN NO KOUHUKU WO
TUIKYUU SURU TO DOUJI NI ,
A

THROBBING TACTILE SENSATION    ⬇    CHANGE OF PRELIMINARILY ANALYZED INFORMATION (WORD, CLAUSE) OF CHARACTER CONTACTED BY FINGER

ZEN JUUGYOUIN NO BUSSIN RYOUMEN NO KOUHUKU WO
TUIKYUU SURU TO DOUJI NI ,
A

FIG. 25

ZEN JUUGYOUIN NO BUSSIN RYOUMEN NO KOUHUKU WO
TUIKYUU SURU TO DOUJI NI ,

⇩ ANALYZE TEXT   CHARACTERS BELONGING TO THE SAME CLAUSE

ZEN JUUGYOUIN NO BUSSIN RYOUMEN NO KOUHUKU WO
TUIKYUU SURU TO DOUJI NI ,

⇩

ZEN JUUGYOUIN NO BUSSIN RYOUMEN NO KOUHUKU WO
TUIKYUU SURU TO DOUJI NI ,

⇩

ZEN JUUGYOUIN NO BUSSIN RYOUMEN NO KOUHUKU WO
TUIKYUU SURU TO DOUJI NI ,

THROBBING TACTILE SENSATION   ⇩ CHANGE OF PRELIMINARILY ANALYZED INFORMATION (WORD, CLAUSE) OF CHARACTER CONTACTED BY FINGER

ZEN JUUGYOUIN NO BUSSIN RYOUMEN NO KOUHUKU WO
TUIKYUU SURU TO DOUJI NI ,

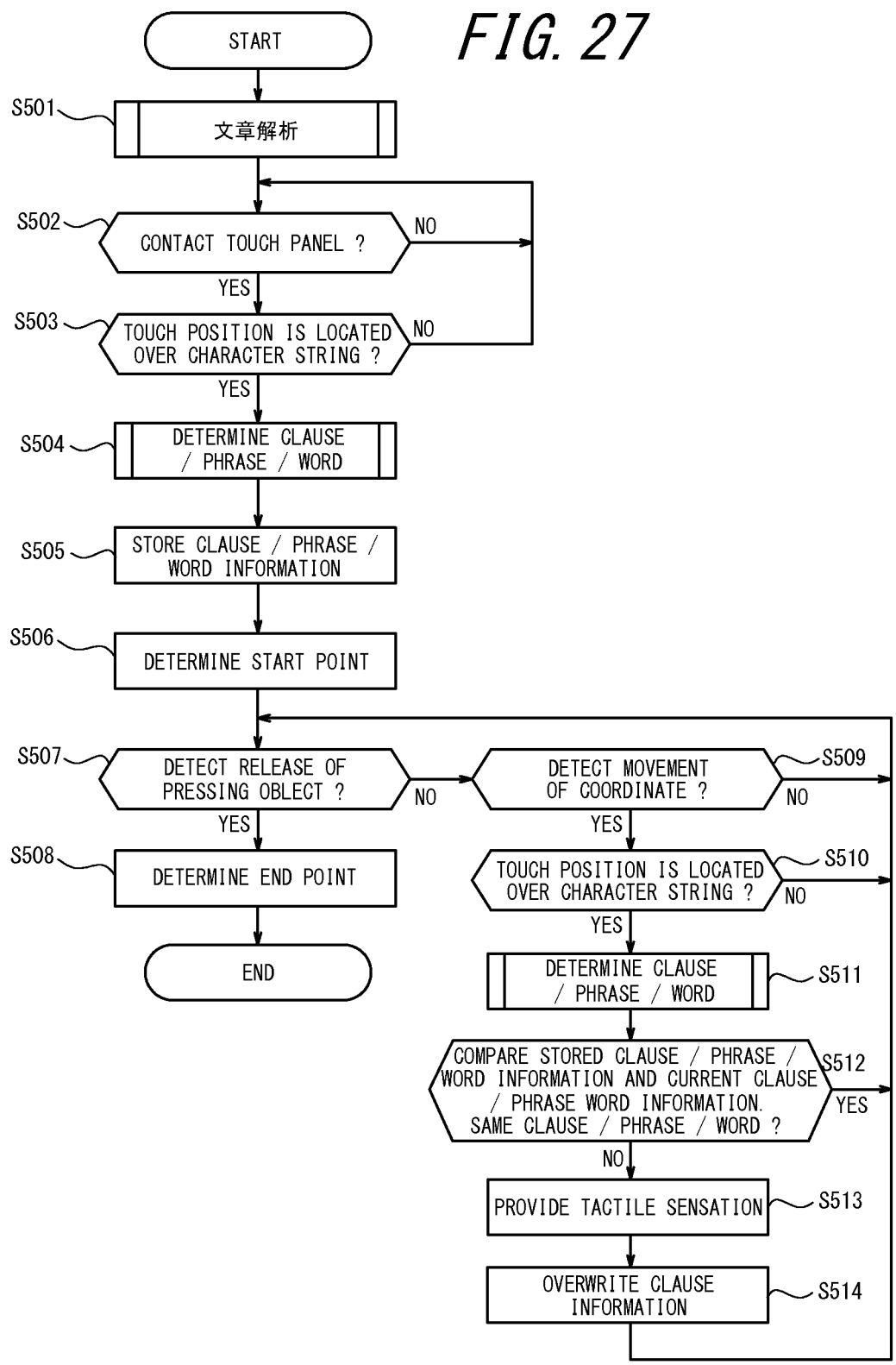

DISPLAY APPARATUS

CROSS REFERENCE TO RELATED APPLICATION

This application claims priority to and the benefit of Japanese Patent Application No. 2010-189940 (filed on Aug. 26, 2010), the entire content of which is incorporated herein by reference.

TECHNICAL FIELD

The embodiment discussed herein relates to a display apparatus having a touch panel mounted thereon.

BACKGROUND

In recent years, a display apparatus having a touch panel has been popularly used as an intuitive input device. Since the touch panel allows operating multiple types of operation panels on a single screen, the touch panel is mainly used for ticket vending machines and ATMs. However, along with introduction of the touch panel to a mobile terminal and appearance of a touch panel interface such as Windows (Registered) 7, a market of the touch panel has been rapidly growing.

Also, an operation to select characters displayed on a display by copy/paste is routinely performed on the touch panel.

However, since the touch panel is generally flat in an operation face thereof and has no mechanical buttons or switches, a user does not obtain feedback upon operation. Therefore, there is a problem that the touch panel provides little operation sensation and increases erroneous operations.

As an input device that allows an intuitive input operation and provides a tactile sensation upon operation, Patent Document 1, for example, suggests a sound output apparatus that, in order to efficiently transmit information including language information and additive attribute information output to user's different sensations such as an auditory sensation and a tactile sensation as well as a visual sensation, reads aloud a character string and also provides a tactile sensation in a specific pattern by using a tactile pin based on attribute added to the character string.

Patent Document 1 also suggests a method to provide a tactile sensation pattern to a specific entry field in input to a plurality of entry fields by applying provision of the tactile sensation patterns by the tactile pin, and a method to provide the tactile sensation pattern based on information added to a file.

Also, Patent Document 2, in order to provide a key touch feeling in operation for the purpose of improvement of operability of the touch panel, suggests a method for a pen-shaped input apparatus having a vibration mechanism for the touch panel, when a position pressed by the pen-shaped input device on the touch panel is located in a display area of a character or a graphic, to provide vibration time, magnitude and pattern defined for each display area.

RELATED ART DOCUMENTS

Patent Document 1: Japanese Patent Laid-Open No. 2005-77674

Patent Document 2: Japanese Patent Laid-Open No. 2002-259044

SUMMARY

Incidentally, the display having the touch panel has a problem that, when the user selects an area by tracing the character string displayed on the display, since the user cannot view an end point of the character string being selected as the characters are covered by a finger, the user stops tracing at an undesired position and has difficulty in selecting a desired character string.

The apparatuses according to techniques disclosed in Patent Documents 1, 2 may not solve this problem. This is because, although the apparatus of Patent Document 1 suggests the method to provide the tactile sensation based on the information added to each character to enable character recognition, this apparatus has no consideration about a process to select the character. Therefore, it is difficult for the user to stop the area selection of the character string at a desired position by feeling vibration generated based simply on an existence of the character.

The apparatus of Patent Document 2 is not prepared for an operation by the finger and allows an operation of the touch panel only by pressing down the predetermined area. Therefore, this apparatus does not assume the area selection by a tracing operation.

In consideration of such problems, a display apparatus is provided such that, when the area selection is performed by tracing the character string displayed on the display having the touch panel by the finger and characters are covered by the finger, the user is enabled to know the end point of the selected character string and to facilitate selection of a desired area of the character string.

In order to achieve the above matter, a display apparatus according to an embodiment includes: a display unit configured to display information including a character string; a touch panel unit disposed in front of the display unit and configured to receive a contact operation by a pressing object to the character string displayed on the display unit; a tactile sensation providing unit configured to provide a tactile sensation to the pressing object contacting the touch panel unit; and a control unit configured to control the display unit, the touch panel unit and the tactile sensation providing unit, wherein the control unit includes a character determination unit configured to determine, when it is determined that a contact position of the contact operation received by the touch panel unit is located over the character string displayed on the display unit, a character type of a character at the contact position and an area specifying unit configured to specify an area by determining a start point and an end point based on the contact operation to the touch panel unit, and controls the tactile sensation providing unit based on a determination result obtained from the character determination unit when the area specifying unit specifies the area.

The character type determined by the character determination unit is preferably any of a double-byte Kanji character, a single-byte Kanji character, a double-byte Hiragana character, a single-byte Hiragana character, a double-byte Katakana character, a single-byte Katakana character, a double-byte alphabet, a single-byte alphabet, a double-byte digit, a single-byte digit, a double-byte symbol, a single-byte symbol, a pictograph, a punctuation mark, a space and a font (font style, italic, bold, font size, font color, background color, effect and underline). The display apparatus preferably includes a memory unit configured to store a different tactile sensation pattern for each of the character types. The control unit preferably instructs the tactile sensation providing unit to provide the tactile sensation based on the tactile sensation pattern corresponding to the character type determined by the character determination unit stored in the memory unit.

Preferably, the control unit instructs the tactile sensation providing unit to provide the tactile sensation when the character determination unit detects one character. Alternatively, it is preferable that the control unit instructs the tactile sensation providing unit to provide the tactile sensation when the character determination unit determines a different character type.

A display apparatus according to another embodiment includes: a display unit configured to display information including a character string; a touch panel unit disposed in front of the display unit and configured to receive a contact operation by a pressing object to the character string displayed on the display unit; a tactile sensation providing unit configured to provide a tactile sensation to the pressing object contacting the touch panel unit; and a control unit configured to control the display unit, the touch panel unit and the tactile sensation providing unit, wherein the control unit includes a text analysis unit configured to analyze a structure of the character string, and to divide the character string displayed on the display unit at a contact position of the contact operation received by the touch panel unit, according to a word, a phrase, a clause or a character type, and an area specifying unit configured to specify an area by determining a start point and an end point based on the contact operation to the touch panel unit, and controls the tactile sensation providing unit based on a segment obtained from the text analysis unit when the area specifying unit specifies the area.

Preferably, the control unit instructs the tactile sensation providing unit to provide the tactile sensation when the contact position on the touch panel unit moves to a different segment divided by the text analysis unit. Alternatively, it is preferable that the control unit instructs the tactile sensation providing unit to provide the tactile sensation when the contact position on the touch panel unit is located over a last character in the segment divided by the text analysis unit.

Preferably, the display apparatus includes a memory unit configured to store different tactile sensation patterns, and the control unit instructs the tactile sensation providing unit, every time the contact position on the touch panel unit moves to a different segment divided by the text analysis unit, or every time the contact position is located over the last character in the segment divided by the text analysis unit, to provide a tactile sensation different at least from that for adjacent segments based on the tactile sensation patterns stored in the memory unit.

Since a tactile sensation is provided to a finger pressing the touch panel when the finger selects an area by tracing the character string displayed on the display having the touch panel, an user may know the end point of the character string being selected even when a character is covered with the finger and easily select a desired area of the character string.

BRIEF DESCRIPTION OF DRAWINGS

FIG. 1 is a functional block diagram schematically illustrating an internal configuration of a display apparatus according to a first embodiment;

FIG. 2 is a diagram illustrating an example of a character type and tactile sensation table;

FIG. 15 is a diagram illustrating the area selection operation according to Example 5 when the Japanese character string is displayed;

FIG. 18 is a diagram illustrating the area selection operation according to Example 6 when the Japanese character string is displayed;

FIG. 20 is a diagram illustrating the area selection operation according to Example 7 when the Japanese character string is displayed;

FIG. 23 is a diagram illustrating the area selection operation according to Example 8 when the Japanese character string is displayed;

FIG. 25 is a diagram illustrating the area selection operation according to Example 9 when the Japanese character string is displayed;

FIG. 27 is a flowchart illustrating an operation according to Example 8 and Example 9.

DESCRIPTION OF EMBODIMENTS

Figure 3:
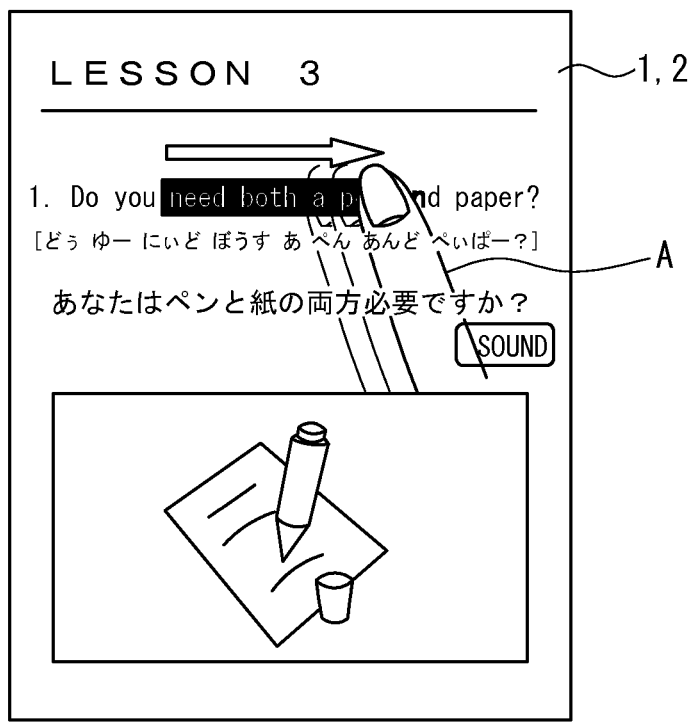
FIG. 3 is a diagram illustrating a state selecting an area by tracing a character string displayed on a display unit by a finger.

Embodiments will be described with reference to the accompanying drawings.

First Embodiment

FIG. 1 is a functional block diagram schematically illustrating an internal configuration of a display apparatus according to a first embodiment. The display apparatus may be, for example, a mobile phone having a touch panel for allowing a character input, a PDA (Personal Digital Assistant), a laptop PC (Personal Computer) and the like. As illustrated in FIG. 1, the display apparatus includes a display unit 1, a touch panel unit 2, a tactile sensation providing unit 3, a control unit 4 and a memory unit 5.

The display unit 1 displays information including a character string. The display unit 1 may be, for example, a liquid crystal display or an organic EL display. The touch panel unit 2 is disposed in front of the display unit 1 and receives an operation by a user. The touch panel unit 2 may be of a type such as a resistive film type, a capacitive type and an optical type. The tactile sensation providing unit 2 provides a tactile sensation to a pressing object contacting the touch panel unit 2 and may be provided, being adhered to the touch panel unit 2 or the like, for vibrating the touch panel unit. The tactile sensation providing unit 3 may be constituted by using any vibration element such as a piezoelectric element or the like which vibrates the touch panel unit 2. According to the embodiment, an object such as a finger or a stylus pen that contacts the touch panel unit 2 is referred to as a "pressing object", and detecting the pressing object on the touch panel unit 2 is referred to as "contact". Also, generation of a contact position signal of the pressing object when the pressing object contacts or presses the touch panel unit 2 is referred to as "to receive an input of a contact operation at a contact position".

The control unit 4 controls the display unit 1, the touch panel unit 2 and the tactile sensation providing unit 3. The control unit 4 includes a character determination unit 6 and an area specifying unit 7.

The character determination unit 6 determines whether a pressing position of a user operation received by the touch panel unit 2 is located over a character displayed on the display unit 1 and also determines a character type of the character. The character type determined by the character determination unit is any of a double-byte Kanji character, a single-byte Kanji character, a double-byte Hiragana character, a single-byte Hiragana character, a double-byte Katakana character, a single-byte Katakana character, a double-byte alphabet, a single-byte alphabet, a double-byte digit, a single-byte digit, a double-byte symbol, a single-byte symbol, a pictograph, a punctuation mark, a space (blank) and a font (font style, italic, bold, font size, font color, background color, effect and underline).

The area specifying unit 7 specifies a selected area by determining a start point and an end point based on the user operation on the touch panel unit 2.

The control unit 4, when the area specifying unit 7 specifies the area, controls the tactile sensation providing unit 3 based on a determination result obtained from the character determination unit 6. The control unit 4 may instruct the tactile sensation providing unit 3 to provide a different tactile sensation for each character type determined by the character determination unit 6. Or, the control unit 4 may instruct the tactile sensation providing unit 3 to provide the tactile sensation every time the character determination unit 6 detects one character, or every time the character type determined by the character determination unit 6 is different.

The memory unit 5 includes a character type and tactile sensation table 8 storing instruction information for the tactile sensation providing unit 3 corresponding to the determination result used by the control unit 4. FIG. 2 illustrates an example of the character type and tactile sensation table 8. The character type and tactile sensation table 8 stores the tactile sensation for each character type to be provided by the tactile sensation providing unit 3. In order to provide tactile sensations in different patterns, when the tactile sensation providing unit 3 is constituted by using the piezoelectric element, a drive signal for the piezoelectric element such as a constant frequency, a cycle (wavelength) and amplitude is changed.

A character type storage unit 9 stores character type information used for determination on the character type, such as the double-byte Kanji character, the single-byte Kanji character, the double-byte Hiragana character, the single-byte Hiragana character, the double-byte Katakana character, the single-byte Katakana character, the double-byte alphabet, the single-byte alphabet, the double-byte digit, the single-byte digit, the double-byte symbol, the single-byte symbol, the pictograph, the punctuation mark, the space (blank) and the font (font style, italic, bold, font size, font color, background color, effect and underline).

Next, an area selection operation by tracing the character string displayed on the display unit according to the display apparatus will be described. In the following examples, it is assumed that, for example, a webpage browsing application is running and, as illustrated in FIG. 3, a web page being read by the user is displayed on the display unit 1. In FIG. 3, in detail, a character string "Do you need both a pen and paper?" in black characters is displayed on the display unit 1, and a finger A traces "need both a pen" on the touch panel unit 2 to highlight the traced part by coloring a background in black and the characters in white. In this case, a start point and an end point of a specified area (selected area) is "n" of the "need" and "n" of the "pen", respectively. In the figure, since the touch panel unit is disposed in front of the display unit 1, the display unit 1 and the touch panel unit 2 indicate the same item.

EXAMPLE 1

Figure 4:
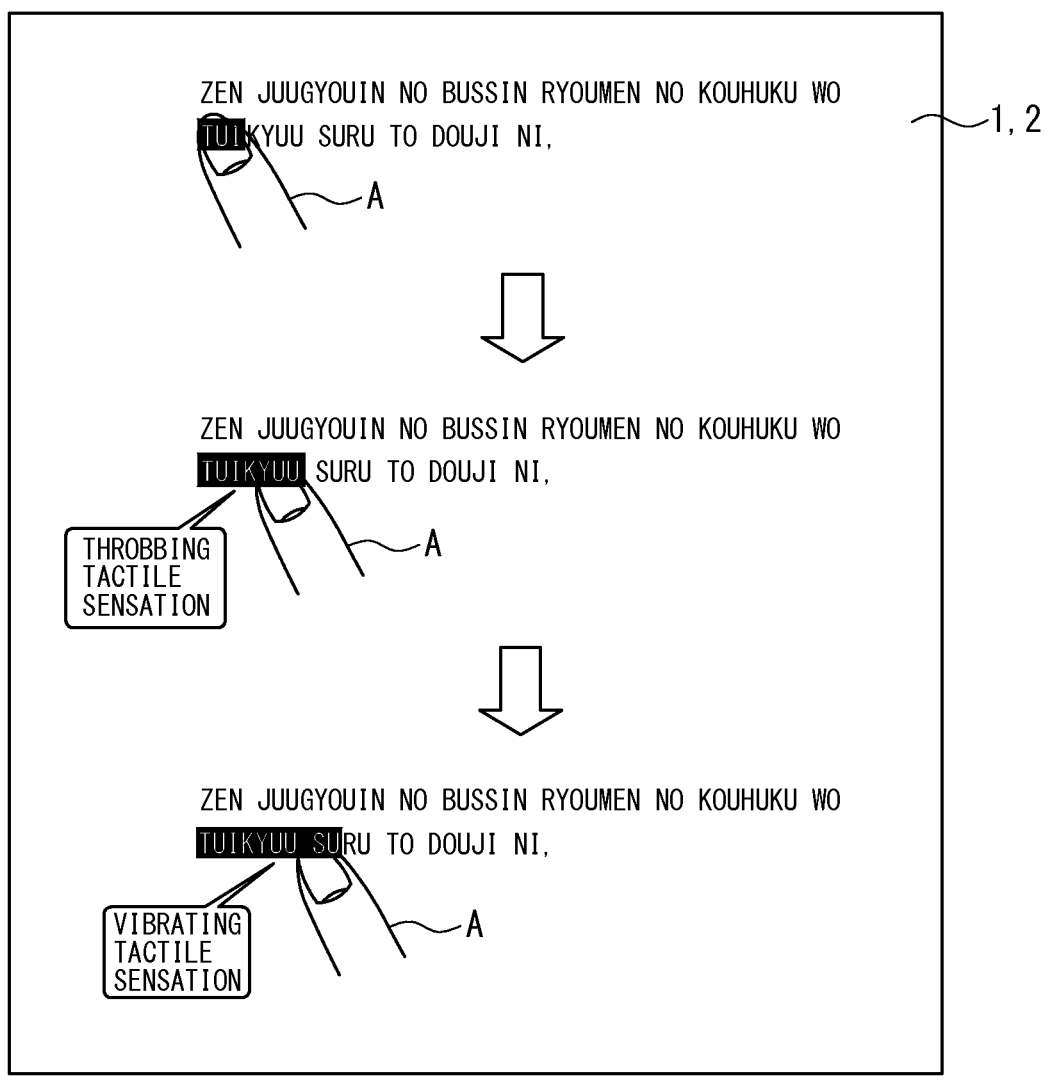
FIG. 4 is a diagram illustrating an area selection operation according to Example 1 when a Japanese character string is displayed.

FIG. 4 is a diagram illustrating an area selection operation according to Example 1 when a Japanese character string is displayed. According to Example 1 illustrated in FIG. 4, when the finger A touches the character string displayed on the display unit 1 via the touch panel unit 2 disposed on the display unit 1 and traces the character string, the control unit 4 selects the area of the character string. Then, when it is determined that the finger A performing the area selection operation is positioned over the character displayed on the display unit, the control unit 4 determines the character type information of the character at the contact position of the finger A. Next, the control unit 4, when the finger A performing the area selection operation moves from the character to a next character of the displayed character string, controls the tactile sensation providing unit 3 based on information added to the character type of each of the characters such that the tactile sensation is provided to the finger A via the touch panel unit 2. According to the Example 1, thereby, erroneous operations in area selection operation may be reduced. According to Example 1, the end point of the selected area of the character string is set to the character for which the tactile sensation is provided immediately before detection of release of the finger. FIG. 4 illustrates one character string at the same position in three lines and arrows representing elapse of a predetermined time. First, the control unit 4 determines "Tsui" selected as indicated on the first line as the start point and then, when the finger A moves from "Tsui" to "kyuu" as indicated on the second line, controls the tactile sensation providing unit 3 to provide a "throbbing" tactile sensation corresponding to the double-byte Kanji character to the finger A, as well as determining that "Tsuikyuu" is selected. Then, when the finger A moves from "kyuu" to "su" as indicated on the third line, the control unit 4 controls the tactile sensation providing unit 3 such that a "vibrating" tactile sensation, corresponding to a double-byte Hiragana character and different from the tactile sensation for the double-byte Kanji character, is provided to the finger A, as well as determining that "Tsuikyuu su" is selected.

Although a tactile sensation pattern corresponding to the double-byte Kanji character is defined as the "throbbing" tactile sensation and a tactile sensation pattern corresponds to the double-byte Hiragana character is defined as the "vibrating" tactile sensation according to the present example, any tactile sensation pattern may be defined for each of the character types. Also, it is not necessary to define different tactile sensation patterns for all of the character types.

Figure 5:
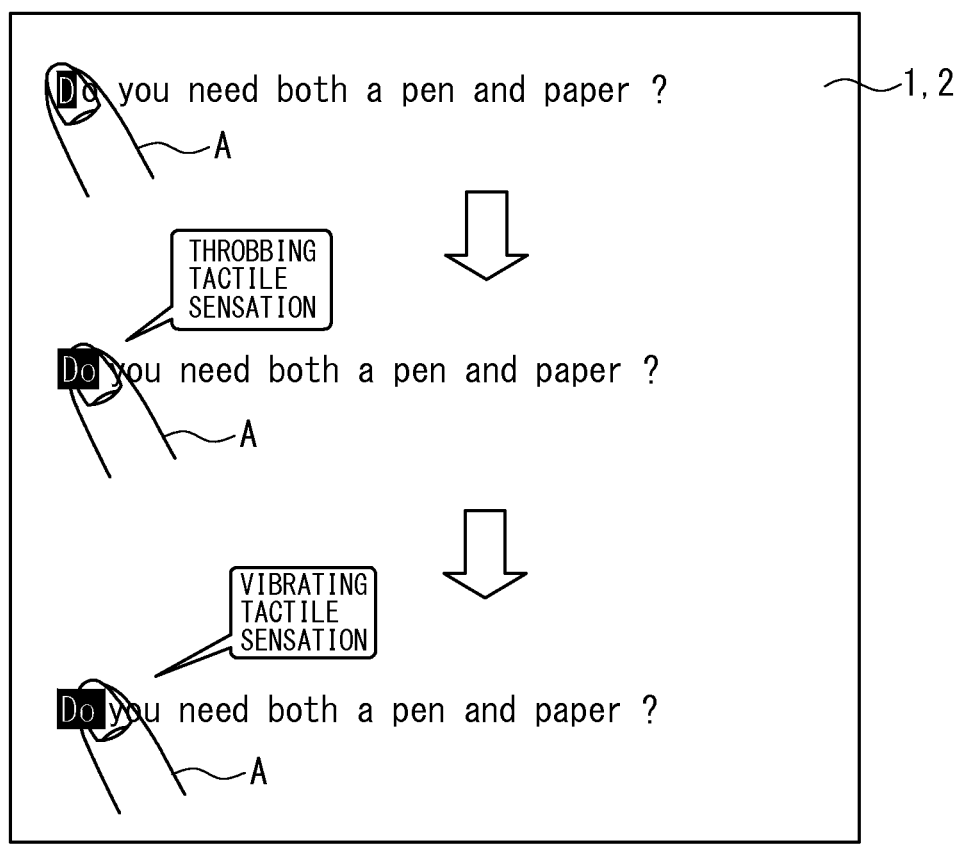
FIG. 5 is a diagram illustrating the area selection operation according to Example 1 when an English character string is displayed.

FIG. 5 is a diagram illustrating the area selection operation according to Example 1 when an English character string is displayed. The control unit 4 determines "D" selected as indicated on a first line of FIG. 5 as the start point and, when the finger A moves from "D" to "o" as indicated on a second line, controls the tactile sensation providing unit 3 to provide the "throbbing" tactile sensation corresponding to the single-byte alphabet to the finger A, as well as determining that "Do" is selected. Then, when the finger A moves from "o" to the "space" as indicated on a third line, the control unit 4 controls the tactile sensation providing unit 3 such that the "vibrating" tactile sensation, corresponding to the "space" and different from the tactile sensation for the single-byte alphabet, is provided to the finger A, as well as determining that "Do" ("Do" and the "space") is selected.

EXAMPLE 2

Figure 6:
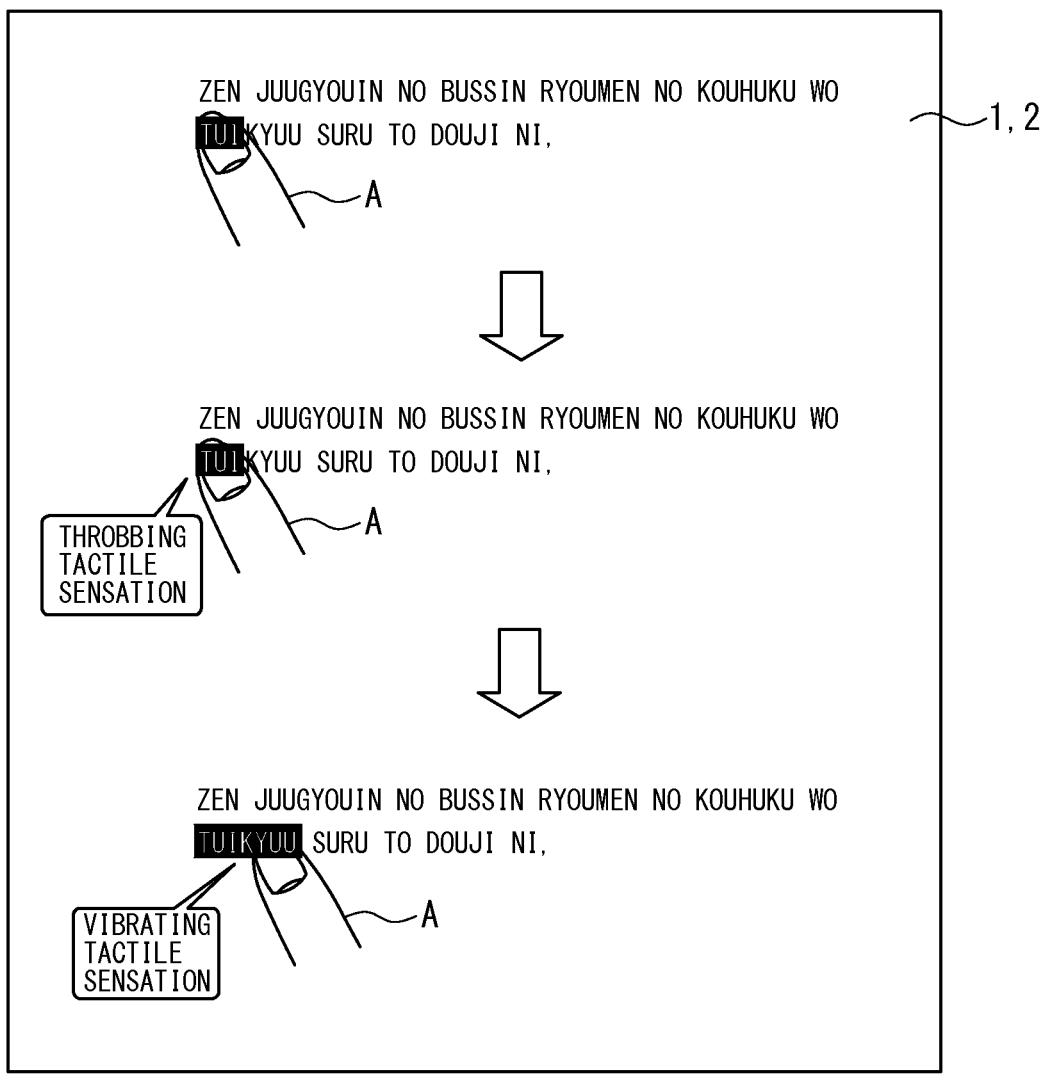
FIG. 6 is a diagram illustrating the area selection operation according to Example 2 when the Japanese character string is displayed.

FIG. 6 is a diagram illustrating the area selection operation according to Example 2 when the Japanese character string is displayed. According to Example 2, in a manner similar to Example 1 illustrated in FIG. 4, the control unit 4, when the finger A performing the area selection operation moves from one character to a next character of the displayed character string, controls the tactile sensation providing unit 3 based on the information added to each of the characters such that the tactile sensation is provided to the finger A via the touch panel unit 2. However, the end point of the selected area is set to a character immediately before the character for which the tactile sensation is provided immediately before detection of release of the finger A. In detail, when the finger A moves from "Tsui" to "kyuu" as indicated on a second line in FIG. 6, the control unit 4 controls the tactile sensation providing unit 3 to provide the "throbbing" tactile sensation corresponding to the double-byte Kanji character to the finger A, as well as determining "Tsui" as the selected area. Then, when the finger A moves from "kyuu" to "su" as indicated on a third line, the control unit 4 controls the tactile sensation providing unit 3 such that the "vibrating" tactile sensation, corresponding to the double-byte Hiragana character and different from the tactile sensation for the double-byte Kanji character, is provided to the finger A, as well as determining that "Tsuikyuu" is selected.

Figure 7:
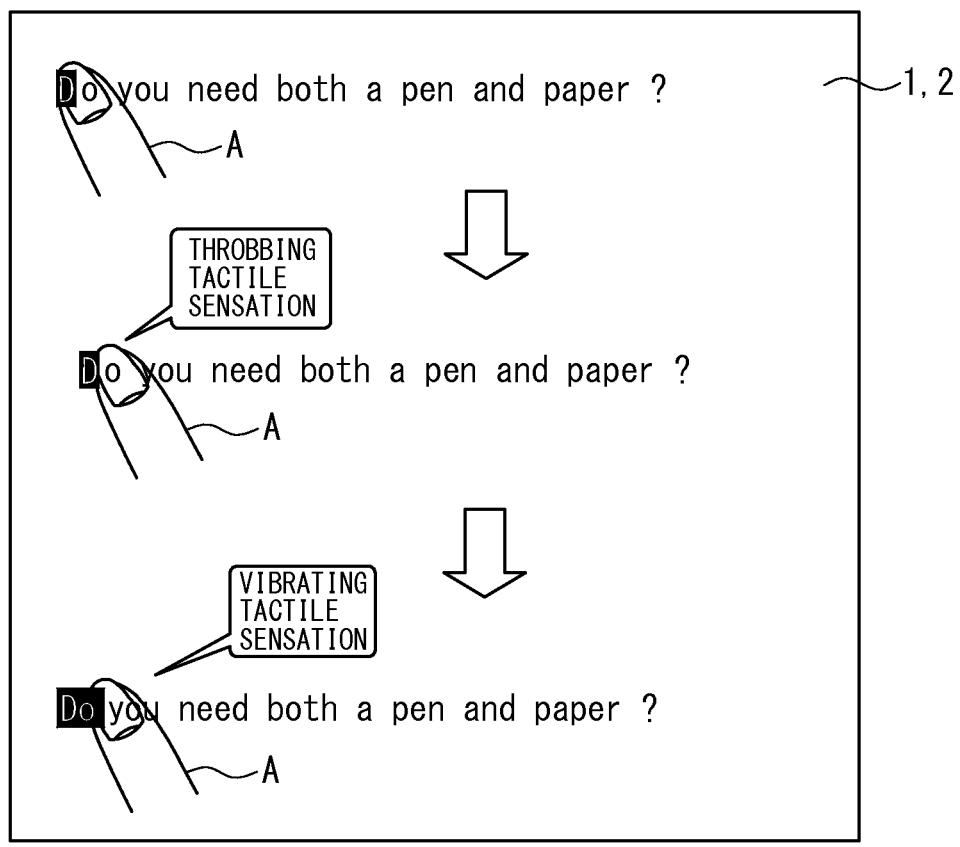
FIG. 7 is a diagram illustrating the area selection operation according to Example 2 when the English character string is displayed.

FIG. 7 is a diagram illustrating the area selection operation according to Example 2 when the English character string is displayed. When the finger A moves from "D" to "o" as indicated on a second line in FIG. 7, the control unit 4 controls the tactile sensation providing unit 3 to provide the "throbbing" tactile sensation corresponding to the single-byte alphabet to the finger A, as well as determining that "D" is selected. Then, when the finger A moves from "o" to the "space" as indicated on a third line, the control unit 4 controls the tactile sensation providing unit 3 such that the "vibrating" tactile sensation, corresponding to the "space" and different from the tactile sensation for the single-byte alphabet, is provided to the finger A, as well as determining that "Do" is selected.

Figure 8:
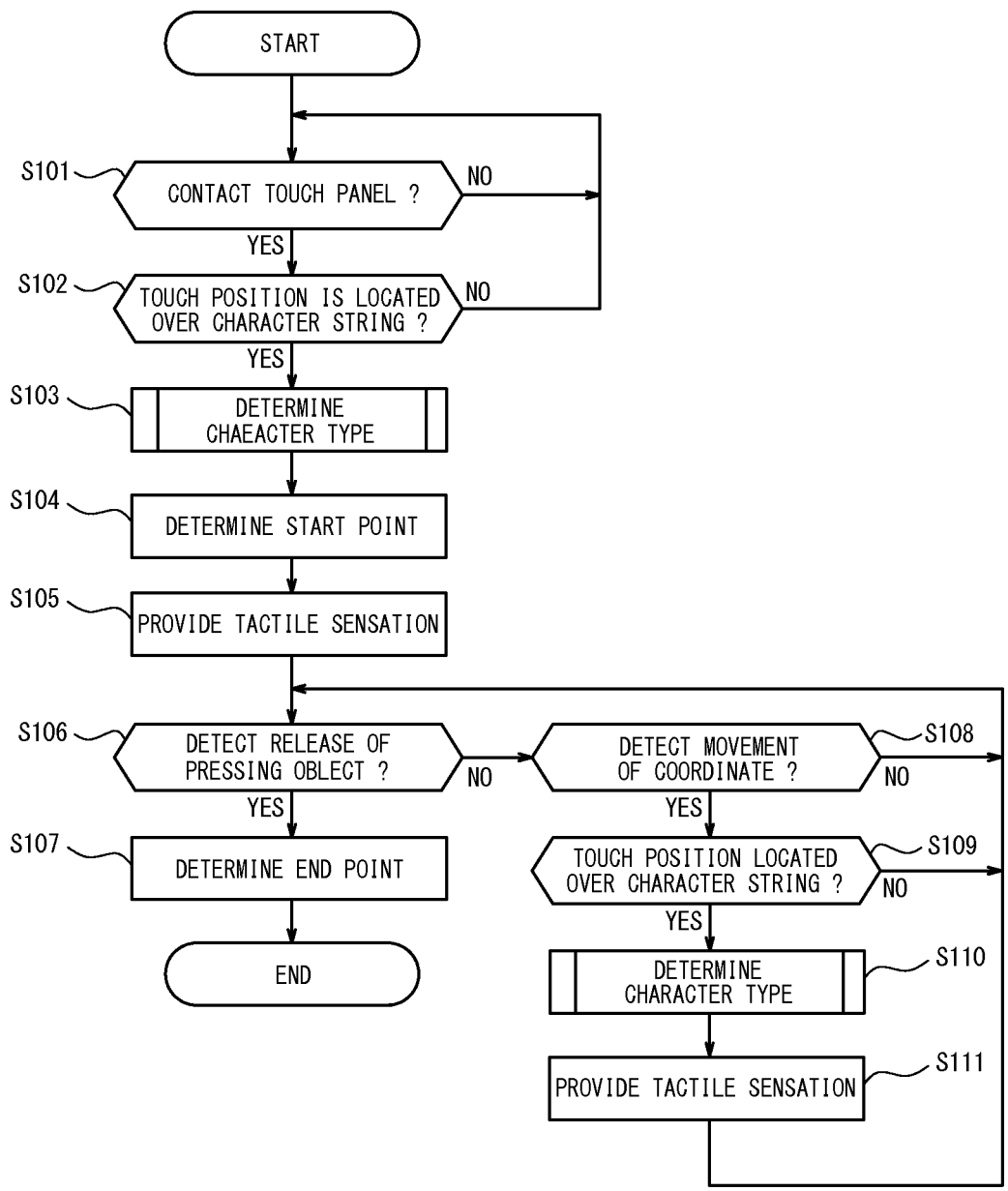
FIG. 8 is a flowchart illustrating an operation according to Example 1 and Example 2.

FIG. 8 is an example of a flowchart illustrating an operation according to Example 1 and Example 2. First, the control unit 4 detects whether the user's finger A has contacted the touch panel unit 2 (S101). Here, the "contact" means a state that the touch panel unit 2 detects the finger A as described above. When the control unit 4 detects contact to the touch panel unit 2 by the finger A (Yes), the character determination unit 6 determines whether the contact position of the finger A is located over the character string displayed on the display unit 1 (S102) and, when determining that the contact position of the finger A is located over the character string (Yes), determines the character type information of the character at the contact position of the finger A (S103). When the control unit 4 does not detect contact to the touch panel unit 2 by the finger A (No at S101), or when the character determination unit 6 determines that the contact position of the finger A is not located over the character string (No at S102), the control unit 4 returns to S101 to detect contact to the touch panel unit 2 by the finger A. After determination of the character type information of the character at S103, the area specifying unit 7 sets the character used for the determination as the start point of the selected area of the character string (S104), and the control unit 4, based on the determination result, instructs the tactile sensation providing unit 3 to provide the tactile sensation (S105).

Next, the control unit 4 detects whether the pressing object (finger A according to the present example) is released from the touch panel unit 2 (S106). When release of the finger A is detected (Yes), the area specifying unit 7 sets the end point of the selected area to the character being contacted before detection of the release according to Example 1, or to a character adjacent to the character being contacted before detection of the release and closer to the start point according to Example 2 (S107).

When the control unit 4 does not detect release of the finger A at S106 (No at S106), the control unit 4 determines whether a movement of a coordinate of the pressing object (movement of the finger A according to the present example) is detected (S108). When the movement of the finger A is detected (Yes), the character determination unit 6 determines whether the finger A has moved to locate over the character string displayed on the display unit 1 (S109) and, when determining that the contact position of the finger A is located over the character string (Yes), determines the character type information of the character at the contact position of the finger A (S110). When the movement of the finger A is not detected at S108 (No), or when the character determination unit 6 determines that the contact position of the finger A is not located over the character string at S109 (No), the control unit 4 returns to S106 to detect release of the finger A. Further, after determination of the character type information at S110, the control unit 4, based on the determination result at S110, instructs the tactile sensation providing unit 3 to provide the tactile sensation (S111) and returns to S106 to detect release of the finger A.

EXAMPLE 3

Figure 9:
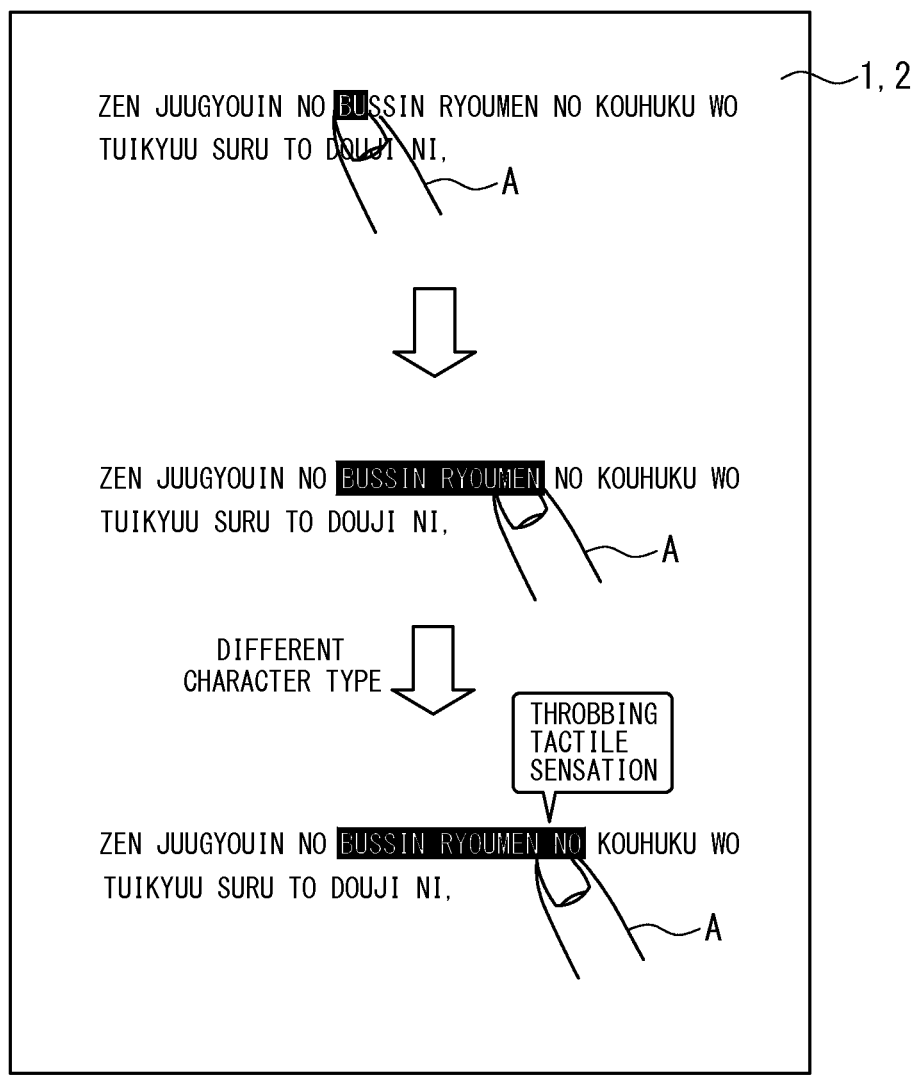
FIG. 9 is a diagram illustrating the area selection operation according to Example 3 when the Japanese character string is displayed.

FIG. 9 is a diagram illustrating the area selection operation according to Example 3 when the Japanese character string is displayed. According to Example 3, when the finger A touches the character string displayed on the display unit 1 via the touch panel unit 2 disposed on the display unit 1 and performs a sliding operation over the character string, the control unit 4 performs the area selection operation for the character string. Then, the control unit 4 determines the character type information of the character at the contact position of the finger A and, when the contact position of the finger A shifts from the character to a next character of the displayed character string, compares the character type information added to each of the characters. When each of the characters have different character type information, the control unit 4, based on the character type information, controls the tactile sensation providing unit 3 such that the tactile sensation is provided to the finger A via the touch panel unit 2. Also, the end point of the selected area is set to the character for which the tactile sensation is provided immediately before detection of release of the finger A. In detail, the control unit 4 sets "Bu" as the start point of the selected area as indicated on a first line in FIG. 9 and, when the finger A selects "Busshinryoumen" as indicated on a second line and then "no" in "Busshinryoumen no", by changing the selection from Kanji characters to a Hiragana character, sets "Busshinryoumen no" as the selected area and controls the tactile sensation providing unit 3 such that the "throbbing" tactile sensation corresponding to the double-byte Kanji character is provided to the finger A. Note that, although not illustrated in the figure, when the finger A further selects "Kou", the control unit 4 determines "Busshinryoumen no Kou" as the selected area and controls the tactile sensation providing unit 3 to provide the "vibrating" tactile sensation corresponding to the double-byte Hiragana character to the finger A.

Figure 10:
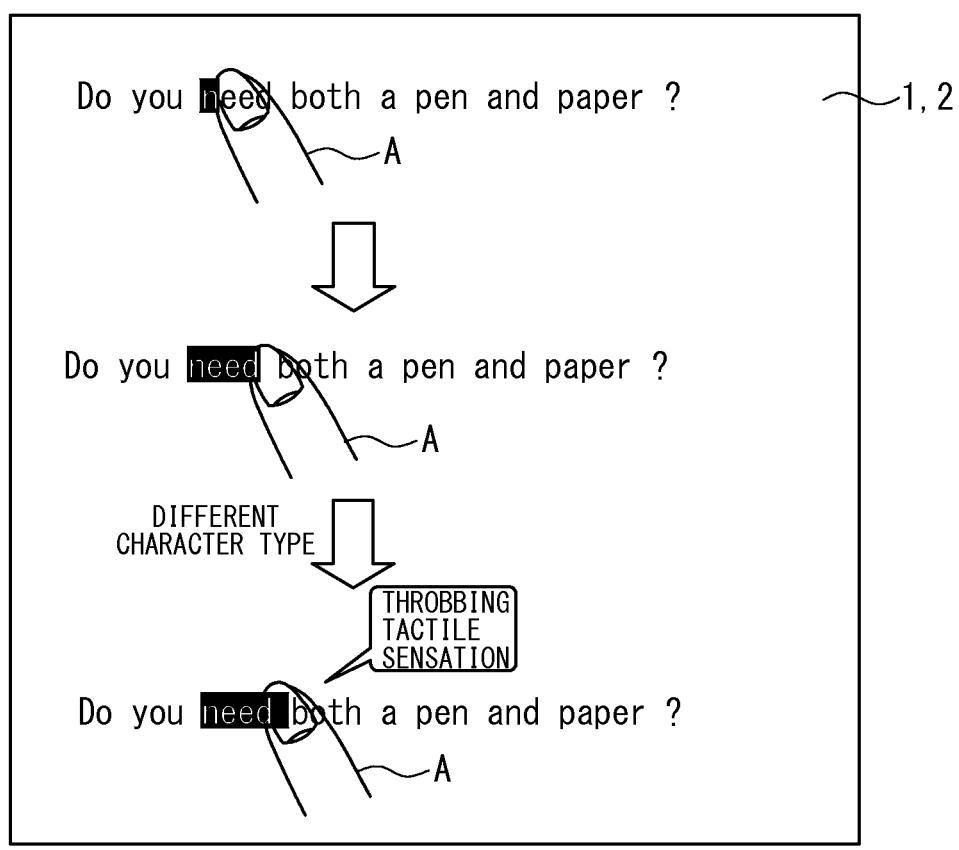
FIG. 10 is a diagram illustrating the area selection operation according to Example 3 when the English character string is displayed.

FIG. 10 is a diagram illustrating the area selection operation according to Example 3 when the English character string is displayed. The control unit 4 sets "n" as the start point of the selected are as indicated on a first line in FIG. 10 and, when the finger A selects "need" as indicated on a second line and then the "space" as indicated on a third line, determines "need" ("need" and the "space") as the selected area and controls the tactile sensation providing unit 3 to provide the "throbbing" tactile sensation corresponding to the single-byte alphabet to the finger A. Note that, although not illustrated in the figure, when the finger A further selects "b", the control unit 4 determines "need b" ("need", the "space" and "b") as the selected area and controls the tactile sensation providing unit 3 to provide the "vibrating" tactile sensation corresponding to the "space" to the finger A.

EXAMPLE 4

Figure 11:
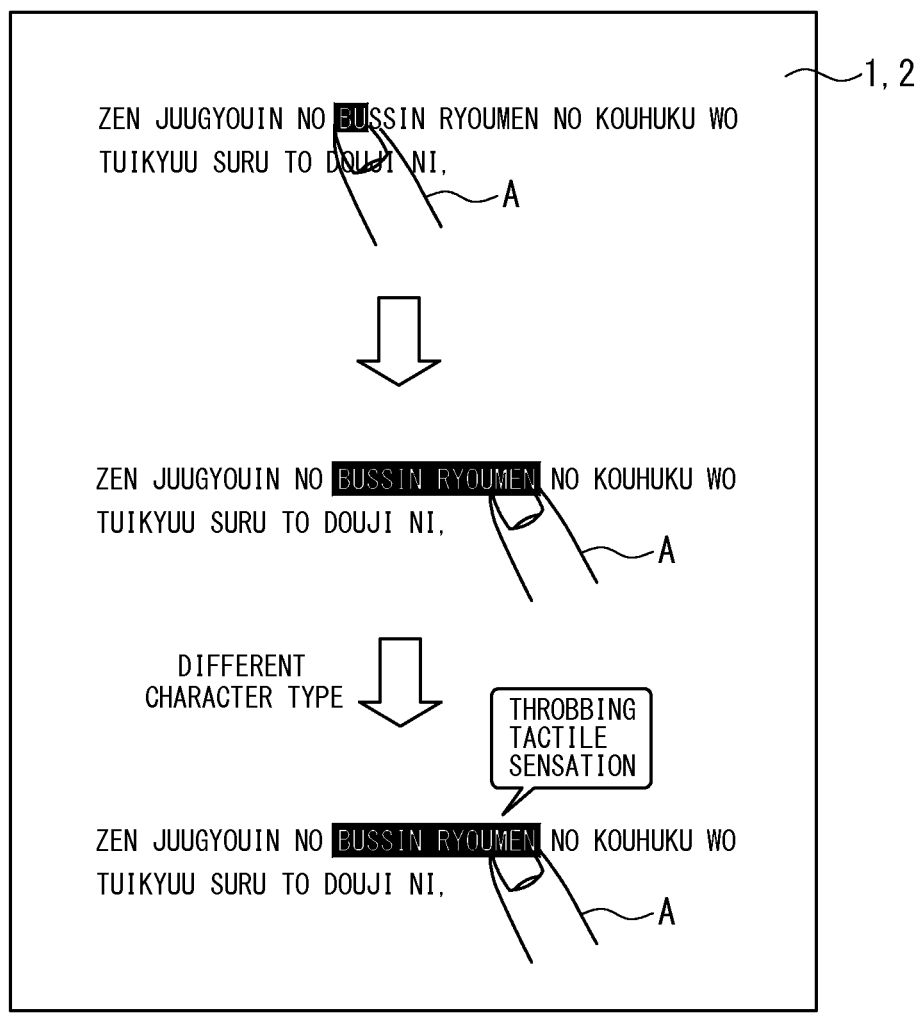
FIG. 11 is a diagram illustrating the area selection operation according to Example 4 when the Japanese character string is displayed.

FIG. 11 is a diagram illustrating the area selection operation according to Example 4 when the Japanese character string is displayed. According to Example 4, the control unit 4, in a manner similar to Example 3, when the position of the finger A moves from a character to a next character of the displayed character string and those characters have different character type information, controls the tactile sensation providing unit 3 based on the character type information such that the tactile sensation is provided via the touch panel unit 2.

However, the control unit 4 sets the end point of the selected area to a character that is adjacent to the character string including the character type information of the character being contacted immediately before detection of release of the finger A and having character type information immediately before that of the character being contacted immediately before detection of the release of the finger A. In detail, the control unit 4 sets "Bu" as the start point of the selected area as indicated on a first line in FIG. 11 and, when the finger A selects "Busshinryoumen" as indicated on a second line and then "no" in "Busshinryoumen no", by changing the selection from Kanji characters to the Hiragana character, sets "Busshinryoumen" as the selected area and controls the tactile sensation providing unit 3 to provide the "throbbing" tactile sensation corresponding to the double-byte Kanji character to the finger A.

Figure 12:
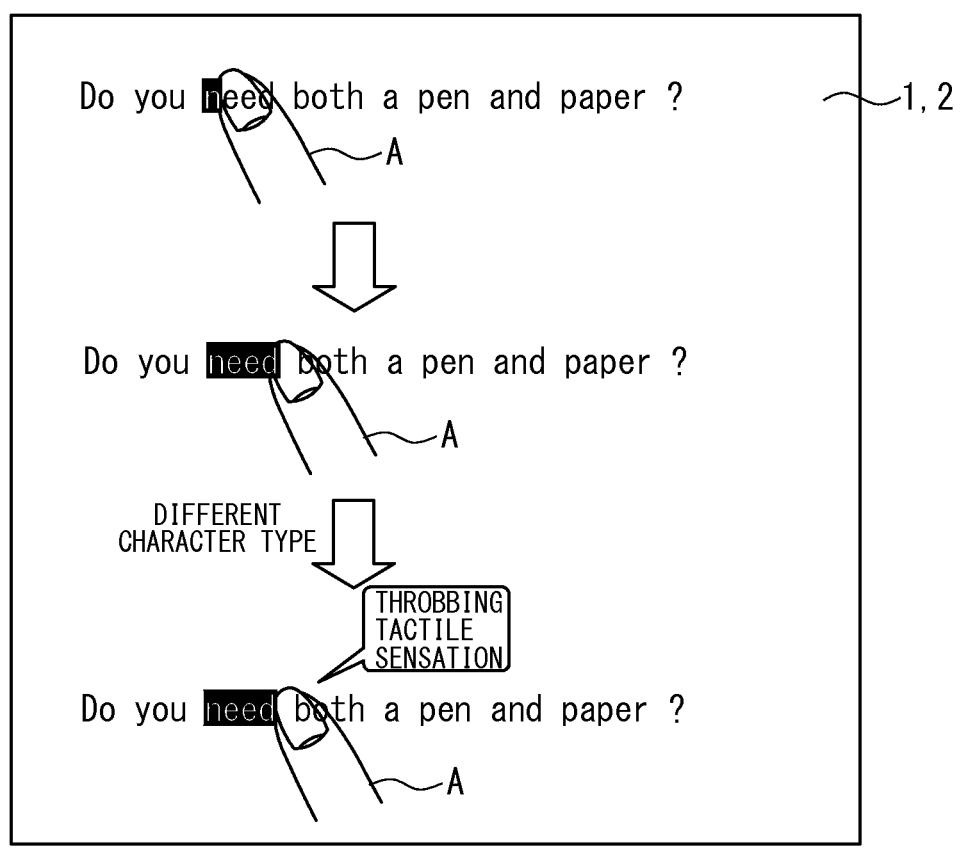
FIG. 12 is a diagram illustrating the area selection operation according to Example 4 when the English character string is displayed.

FIG. 12 is a diagram illustrating the area selection operation according to Example 4 when the English character string is displayed. The control unit 4, when the finger A selects "n" as the start point as indicated on a first line in FIG. 12, then "need" as indicated on a second line and the "space" as indicated on a third line, sets "need" as the selected area and controls the tactile sensation providing unit 3 to provide the "throbbing" tactile sensation corresponding to the single-byte alphabet to the finger A.

Figure 13:
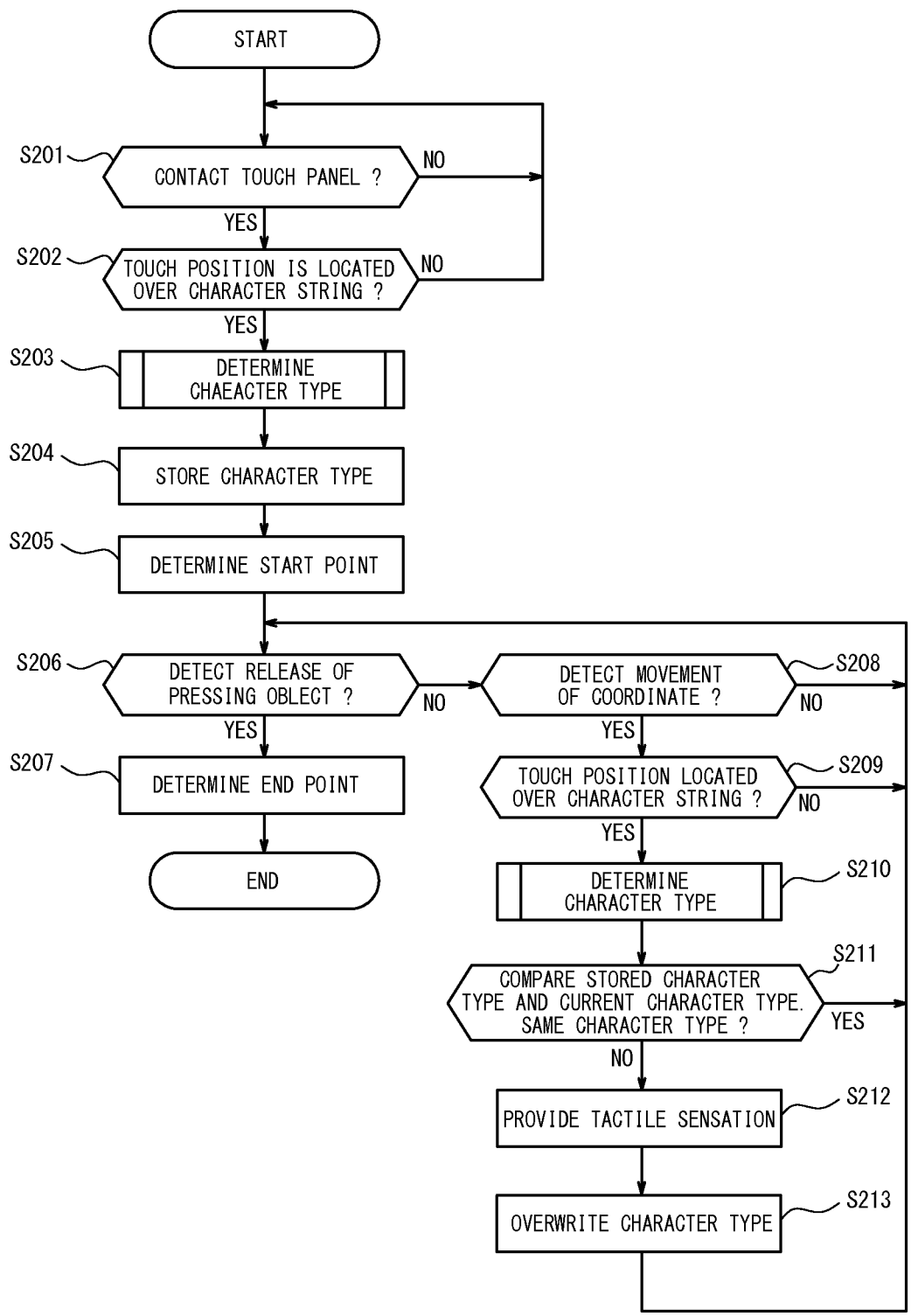
FIG. 13 is a flowchart illustrating an operation according to Example 3 and Example 4.

FIG. 13 is an example of a flowchart illustrating an operation according to Example 3 and Example 4. First, the control unit 4 detects whether the user's finger A has contacted the touch panel unit 2 (S201). When the control unit 4 detects the contact to the touch panel unit 2 by the finger A (Yes), the character determination unit 6 determines whether the contact position of the finger A is located over the character string displayed on the display unit 1 (S202) and, when determining that the contact position of the finger A is located over the character string (Yes), determines the character type information of the character at the contact position of the finger A (S203). When the control unit 4 does not detect the contact position of the finger A on the touch panel unit 2 (No at S101), or when the character determination unit 6 determines that the contact position of the finger A is not located over the character string (No at S202), the control unit 4 returns to S201 to detect contact to the touch panel by the finger A. Next, the control unit 4 stores the character type information determined at S203 in the character type storage unit 9 (S204), and the area specifying unit 7 sets the character used for determination at S203 as the start point of the selected area of the character string (S205).

Next, the control unit 4 detects whether the pressing object (finger A according to the present example) is released from the touch panel unit 2 (S206). When release of the finger A is detected (Yes), the area specifying unit 7 sets the end point of the selected area to the character being contacted before detection of the release according to Example 3, or to the character having the character type immediately before that of the character being contacted before detection of the release and closer to the start point according to Example 4 (S207).

The control unit 4, when release of the finger A is not detected at S206 (No), determines whether the movement of the coordinate of the pressing object (movement of the finger A according to the present example) is detected (S208). When the movement of the finger A is detected (Yes), the character determination unit 6 determines whether the finger A has moved to be located over the character string displayed on the display unit 1 (S209) and, when determining that the contact position of the finger A is located over the character string (Yes), determines the character type information of the character at the contact position of the finger A (S210). When the movement of the finger A is not detected at S208 (No), or when the character determination unit 6 determines that the contact position of the finger A is not located over the character string at S209 (No), the control unit 4 returns to S206 to detect release of the finger A.

Next, after determination of the character type information at S210, the control unit 4 determines whether the character type of the character determined at S210 is the same as the character type stored in the character type storage unit 9 (S211) and, when determining that the character type determined at S210 is different (No), instructs the tactile sensation providing unit 3 based on the determination result at S210 to provide the tactile sensation (S212). When determining that the character type is the same as that stored in the character type storage unit 9 (Yes), the control unit 4 returns to S206 to detect release of the finger A. After provision of the tactile sensation at S212, further, the control unit 4 overwrites the character type information in the character type storage unit 9 with the character type information determined at S210 (S213) and returns to S206 to detect release of the finger A.

Here, as illustrated in FIG. 2, the tactile sensation pattern for each of the character type may be stored as the character type and tactile sensation table 8 such that a different tactile sensation pattern is provided based on the character type at S212.

Second Embodiment

Figure 14:
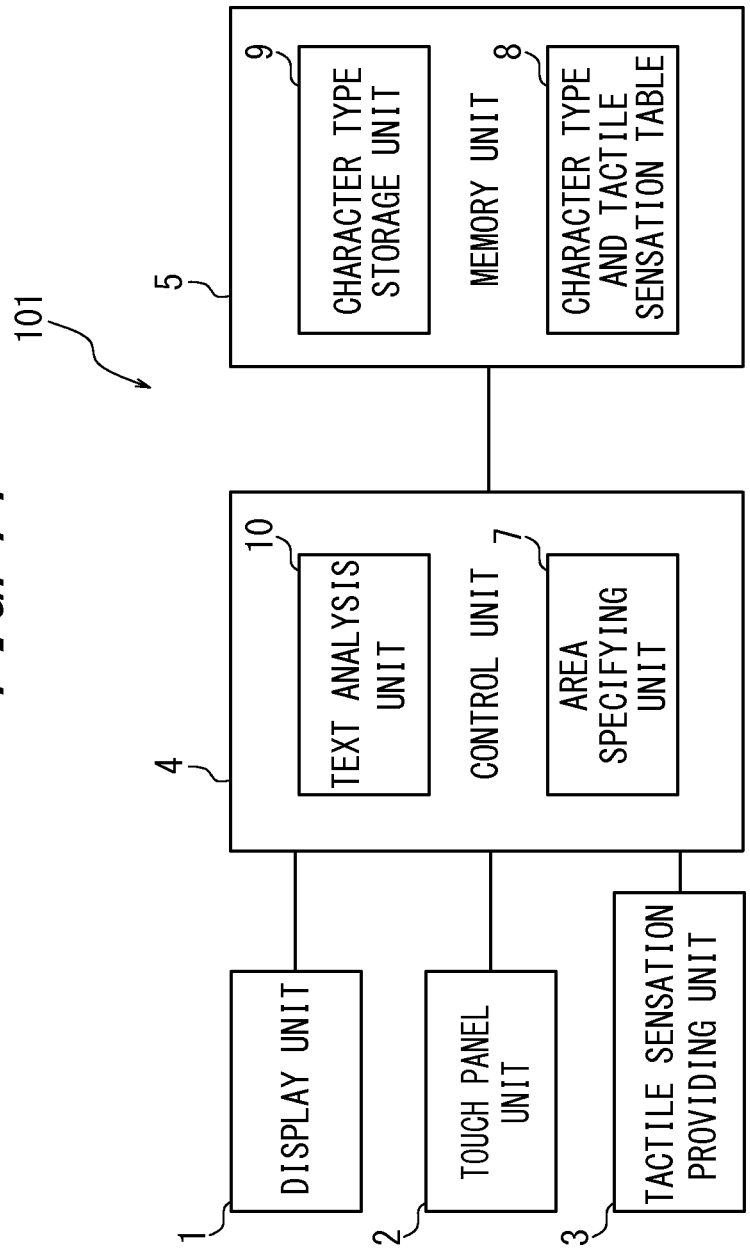
FIG. 14 is a functional block diagram schematically illustrating an internal configuration of a display apparatus according to a second embodiment.

Next, a display apparatus according to a second embodiment will be described. FIG. 14 is a functional block diagram schematically illustrating an internal configuration of the display apparatus according to the second embodiment. As illustrated in FIG. 14, the display apparatus includes the display unit 1, the touch panel unit 2, the tactile sensation providing unit 3, the control unit 4 and the memory unit 5.

The control unit 4 controls the display unit 1, the touch panel unit 2 and the tactile sensation providing unit 3. The control unit 4 includes a text analysis unit 10 and the area specifying unit 7.

The text analysis unit 10, by analyzing a structure of the character string displayed on the display unit 1, determines a word, a phrase, a clause and the character type based on the pressing position of the touch panel unit 2 and divides the character string into segments. The character type analyzed by the text analysis unit 10 is any of the double-byte Kanji character, the single-byte Kanji character, the double-byte Hiragana character, the single-byte Hiragana character, the double-byte Katakana character, the single-byte Katakana character, the double-byte alphabet, the single-byte alphabet, the double-byte digit, the single-byte digit, the double-byte symbol, the single-byte symbol, the pictograph, the punctuation mark, the space (blank) and the font (font style, italic, bold, font size, font color, background color, effect and underline).

The area specifying unit 7 specifies the selected area by determining the start point and the end point based on the user operation to the touch panel unit 2.

The control unit 4, when the area specifying unit 7 specifies the area, controls the tactile sensation providing unit 3 based on the segment obtained from the text analysis unit 10. The control unit 4 may instruct the tactile sensation providing unit 3 to provide a different tactile sensation based on the segment obtained from the text analysis unit 10. In this case, the control unit 4 may instruct the tactile sensation providing unit 3 to provide a different tactile sensation every time obtaining a different segment from the text analysis unit 10. For example, the control unit 4 may instruct the tactile sensation providing unit 3 to provide a different tactile sensation based on the number of provision of the tactile sensation during the area selection operation. Or, the control unit 4 may instruct the tactile sensation providing unit 3 to provide the tactile sensation every time the contact position on the touch panel unit 2 moves to a different segment divided by the text analysis unit 10. Further, the control unit 4 may instruct the tactile sensation providing unit 3 to provide the tactile sensation every time the contact position on the touch panel 2 is located over a last character or a first character of the segment divided by the text analysis unit 10. Such provision of the tactile sensation may be substantialized by, in a manner similar to the first embodiment, storing necessary information such as the tactile sensation patterns in the memory unit 5. Although a different tactile sensation may be provided every time, since a purpose to facilitate recognition of the selected area of the character string may be accomplished by changing the tactile sensation patterns at least between adjacent segments, two tactile sensation patterns may be prepared.

Since the display unit 1, the touch panel unit 2, the tactile sensation providing unit 3 and the memory unit 5 are similar to those in the first embodiment, descriptions thereof will be omitted.

EXAMPLE 5

FIG. 15 is a diagram illustrating the area selection operation according to Example 5 when the Japanese character string is displayed. According to Example 5, the control unit 4 preliminarily analyzes a structure of text in an entire web page in terms of character boundary information such as the character type, the word, the clause and the like. Then, when the finger A selects an area of the character string and the character at the contact position of the finger A is adjacent to a character type boundary based on the preliminarily analyzed character boundary information (information about positions of segments), the control unit 4 controls the tactile sensation providing unit 3 to provide the tactile sensation via the touch panel unit 2. Also, the end point of the selected area of the character string is set to the character for which the tactile sensation is provided immediately before detection of release. In detail, for a character string "Zenjuugyouin no Busshinryoumen no Kouhuku wo Tsuikyuu Suruto Douji ni," illustrated on a first line in FIG. 15, the text analysis unit 10 of the control unit 4 inserts the character boundary information as indicated by "Zenjuugyouin/no/Busshinryoumen/no/Kouhuku/wo/Tsuikyuu/Suruto/Douji/ni/," on a second line. Then, when the finger A contacts a position corresponding to "Bu" as indicated on a third line, since the character is adjacent to the character type boundary (a boundary between "no" and "Bu"), the control unit 4 controls the tactile sensation providing unit 3 to provide the "throbbing" tactile sensation. When the finger A slides as indicated on a fourth line and traces "Busshinryoumen" as indicated on a fifth line, since the character is adjacent to the character type boundary being set (boundary between "men" and "no"), the control unit 4 controls the tactile sensation providing unit 3 to provide the "throbbing" tactile sensation again. When the finger A is released at this point, "Busshinryoumen" is determined as the selected area.

Figure 16:
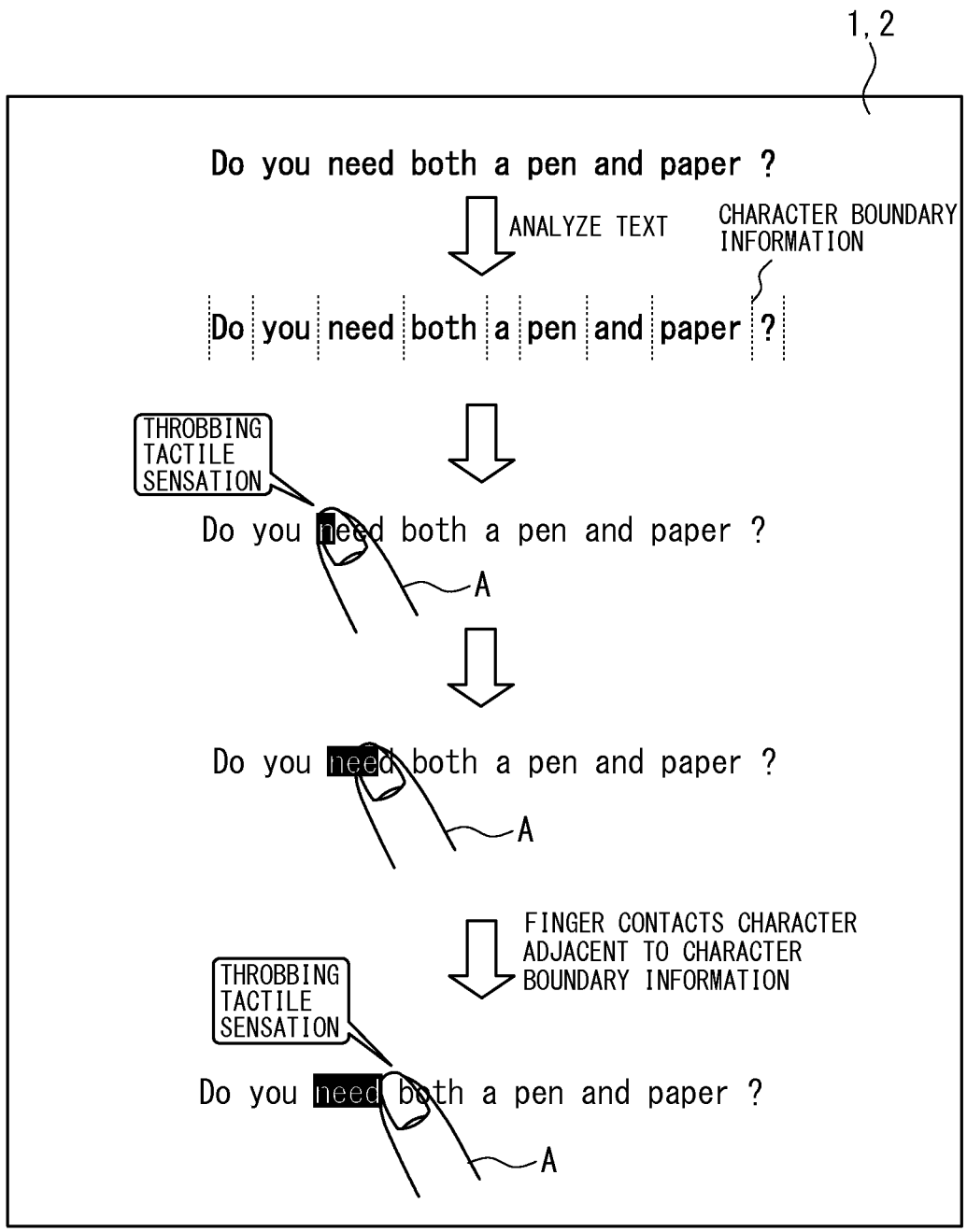
FIG. 16 is a diagram illustrating the area selection operation according to Example 5 when the English character string is displayed.

FIG. 16 is a diagram illustrating the area selection operation according to Example 5 when the English character string is displayed. For the character string "Do you need both a pen and paper?" indicated on a first line in FIG. 16, the text analysis unit 10 of the control unit 4 inserts the character boundary information as indicated by "Do/you/need/both/a/ pen/and/paper/?" on a second line. Then, when the finger A contacts a position corresponding to "n" as indicated on a third line, since the character is adjacent to the character type boundary, the control unit 4 controls the tactile sensation providing unit 3 to provide the "throbbing" tactile sensation. When the finger A slides as indicated on a fourth line and traces "need" as indicated on a fifth line, since the character is adjacent to the character type boundary being set, the control unit 4 controls the tactile sensation providing unit 3 to provide the "throbbing" tactile sensation again. When the finger A is released at this point, "need" is determined as the selected area.

Figure 17:
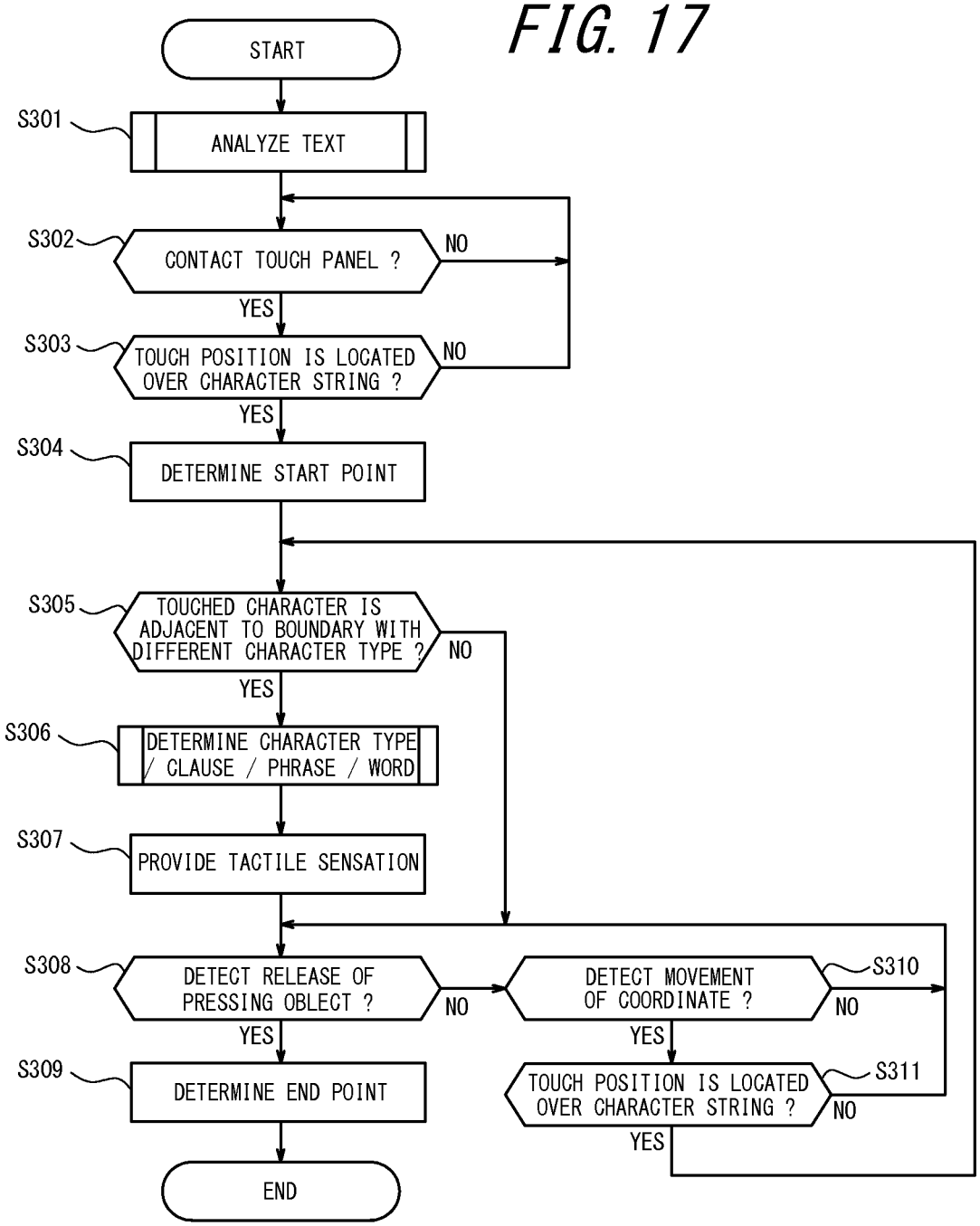
FIG. 17 is a flowchart illustrating an operation according to Example 5.

FIG. 17 is an example of a flowchart illustrating an operation according to Example 5. First, the text analysis unit 10 analyzes entire text and stores boundaries segmenting (dividing) the text in terms of the character type, the clause, the phrase and the word in the memory unit 5 (S301). Next, the control unit 4 detects whether the pressing object (the user's finger A according to the present example) has contacted the touch panel unit 2 (S302). When the control unit 4 detects the contact to the touch panel unit 2 by the finger A (Yes), the text analysis unit 10 determines whether the contact position of the finger A is located over the character string displayed on the display unit 1 (S303). When the text analysis unit 10 determines that the contact position of the finger A is located over the character string (Yes), the area specifying unit 7 sets the character at the contact position of the finger A as the start point (S304). When the text analysis unit 10 determines that the contact position of the finger A is not located over the character string (No), the control unit 4 returns to S302 to detect contact to the touch panel by the finger A.

Next, the text analysis unit 10 determines whether the character at the contact position of the finger A analyzed and stored at S301 is adjacent to the stored boundary (S305) and, when determining that the character at the contact position of the finger A is adjacent to the stored boundary (Yes), determines the character type of the character at the contact position of the finger A (S306). The control unit 4, based on the determined character type information, instructs the tactile sensation providing unit 3 to provide the tactile sensation (S307). Next, the control unit 4 detects whether the finger A is released from the touch panel unit 2 (S308). The control unit 4 detects whether the finger A is released from the touch panel unit 2 also when the text analysis unit 10 determines that the character at the contact position of the finger A is not adjacent to the boundary (No) (S308). When release of the finger A is detected (Yes), the area specifying unit 7 sets the character determined at S305 and S306 as the end point of the selected area (S309).

When release of the finger A is not detected at S308 (No), the control unit 4 determines whether the movement of the coordinate of the pressing object (the movement of the finger A according to the present example) is detected (S310). When the movement of the finger A is detected (Yes), the text analysis unit 10 determines whether the finger A is moved to be located over the character string displayed on the display unit 1 (S311) and, when determining that the contact position of the finger A is located over the character string (Yes), returns to S305 to determine whether the character is adjacent to the boundary. When the movement of the finger A is not detected at S310 (No), or when the text analysis unit 10 determines that the contact position of the finger A is not located over the character string at S311 (No), the control unit 4 returns to S308 to detect release of the finger A.

EXAMPLE 6

FIG. 18 is a diagram illustrating the area selection operation according to Example 6 when the Japanese character string is displayed. According to Example 6, the control unit 4 preliminarily analyzes the structure of the text in the entire web page in terms of the character boundary information such as the character type, the word, the clause and the like. Then, when the finger A selects an area of the character string and the contact position of the finger A moves from one character to a next character of the displayed character string across the character boundary information set between the characters, the control unit 4 controls the tactile sensation providing unit 3 based on the character boundary information such that the tactile sensation is provided via the touch panel unit 2. Also, the end point of the selected area is set to the character being contacted immediately before detection of release of the finger A. In detail, after the character boundary information is inserted in a manner similar to the character string indicated on a second line in FIG. 15, when the finger A contacts the position corresponding to "Bu" as indicated on a third line and slides as indicated on a fourth line to trace "Busshinryoumen no" as indicated on a fifth line, since the finger A moves across the character boundary information being set (that is, across the divided segments), the control unit 4 controls the tactile sensation providing unit 3 to provide the "throbbing" tactile sensation. When the finger A is released at this point, "Busshinryoumen no" is determined as the selected area.

Figure 19:
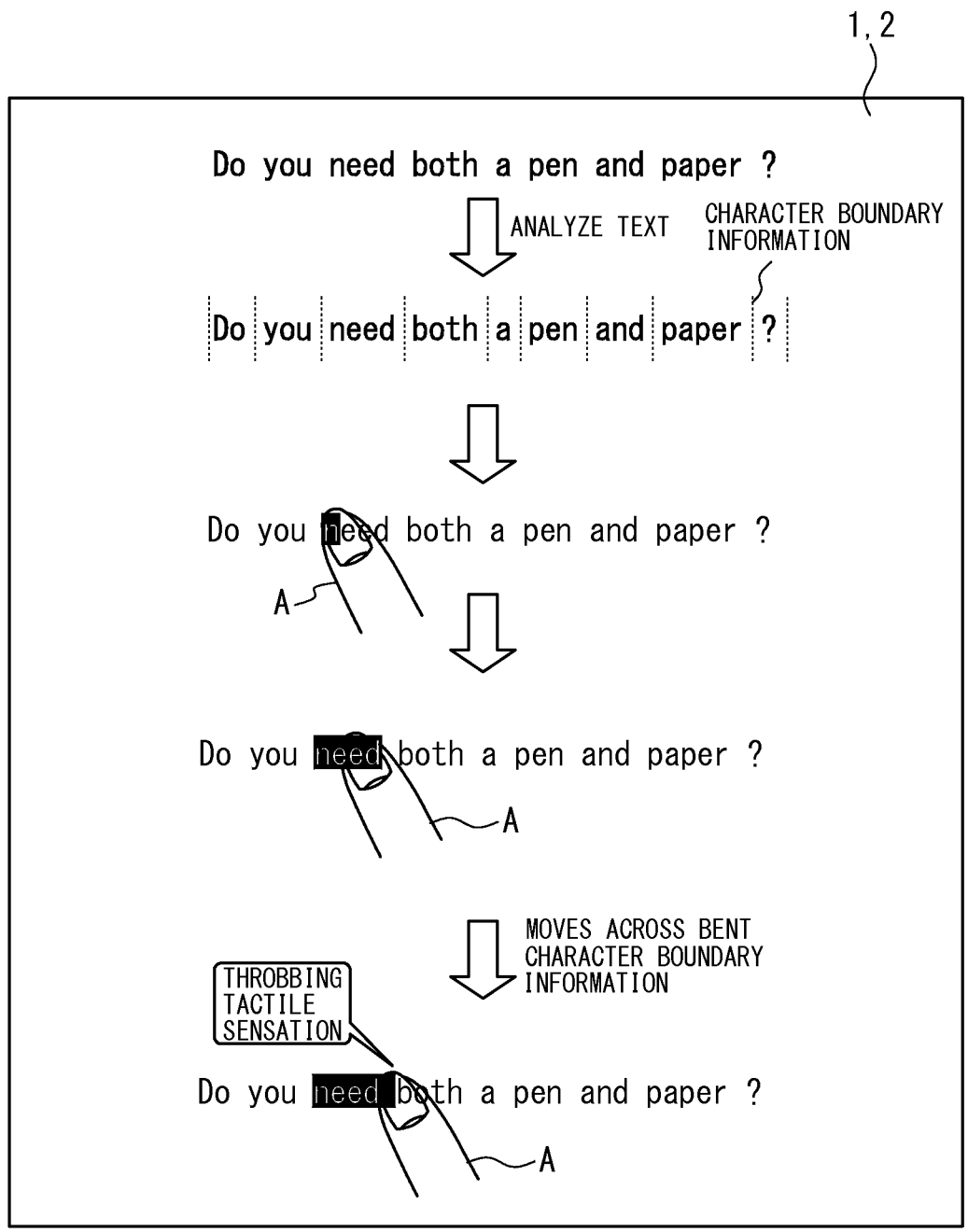
FIG. 19 is a diagram illustrating the area selection operation according to Example 6 when the English character string is displayed.

FIG. 19 is a diagram illustrating the area selection operation according to Example 6 when the English character string is displayed. After the character boundary information is inserted in a manner similar to the character string indicated on a second line in FIG. 16, when the finger A contacts the position corresponding to "n" as indicated on a third line and slides as indicated on a fourth line to trace "need" ("need" and the "space") as indicated on fifth line, since the finger A moves across the character boundary information being set (that is, across the divided segments), the control unit 4 controls the tactile sensation providing unit 3 to provide the "throbbing" tactile sensation. When the finger A is released at this point, "need" ("need" and the "space") or "need" is determined as the selected area.

EXAMPLE 7

FIG. 20 is a diagram illustrating the area selection operation according to Example 7 when the Japanese character string is displayed. According to Example 7, although the control unit 4 selects an area of the character string in a manner similar to Example 6, the end point of the selected area is set to the character that is adjacent to the character boundary information for which the tactile sensation is provided immediately before detection of the release of the finger A and contacted immediately before the finger A moves across the character boundary information. In detail, after an operation similar to that indicated from a first line to a fourth line in FIG. 18, when the finger A traces "Busshinryoumen no" as indicated on a fifth line, since the finger A moves across the character boundary information being set, the control unit 4 controls the tactile sensation providing unit 3 to provide the "throbbing" tactile sensation. When the finger A is released at this point, "Busshinryoumen" is determined as the selected area.

Figure 21:
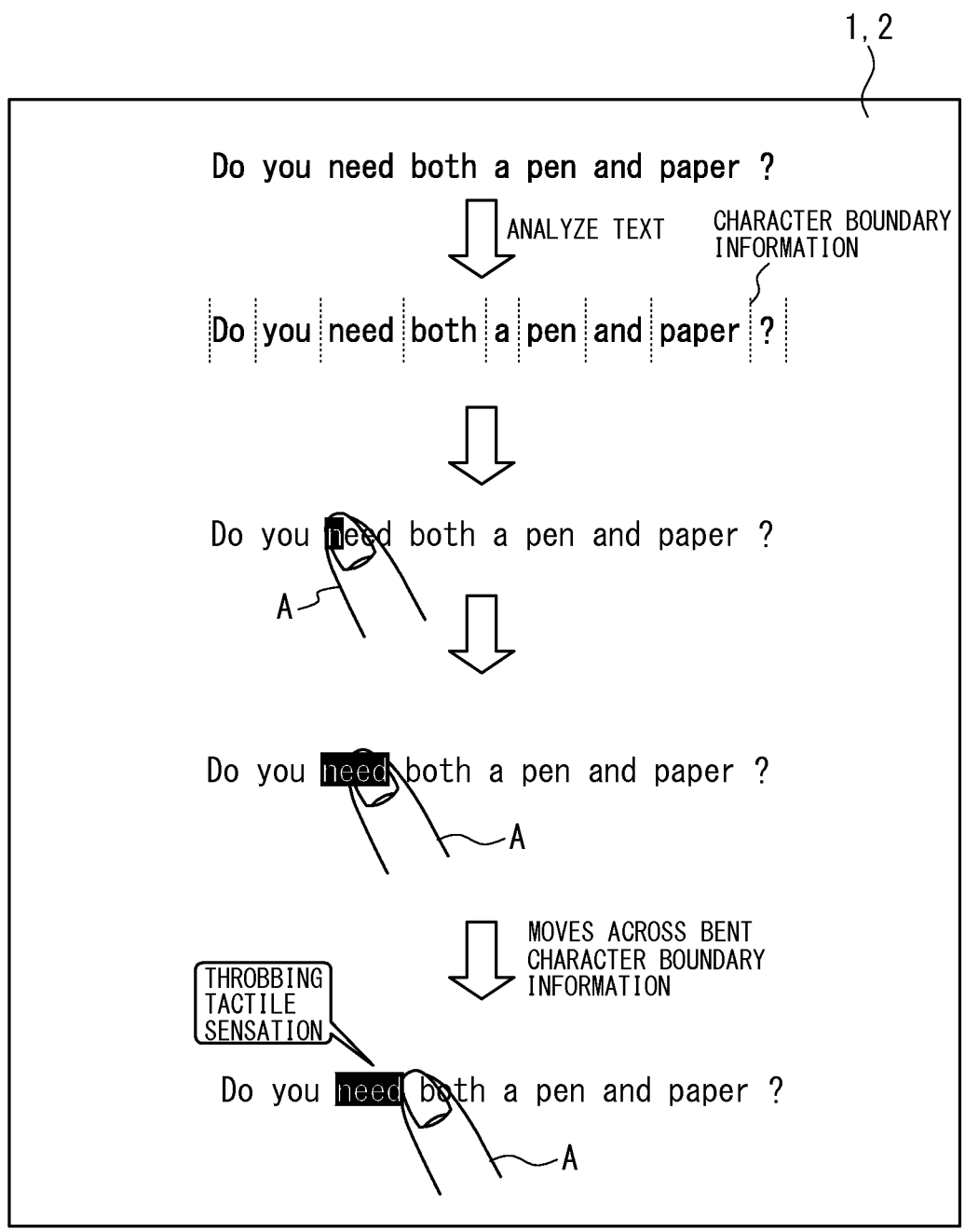
FIG. 21 is a diagram illustrating the area selection operation according to Example 7 when the English character string is displayed.

FIG. 21 is a diagram illustrating the area selection operation according to Example 7 when the English character string is displayed. After an operation similar to that indicated from a first line to a fourth line in FIG. 19, when the finger A traces "need" ("need" and the "space") as indicated on a fifth line, since the finger A moves across the character boundary information being set, the control unit 4 controls the tactile sensation providing unit 3 to provide the "throbbing" tactile sensation. When the finger A is released at this point, "need" is determined as the selected area.

Figure 22:
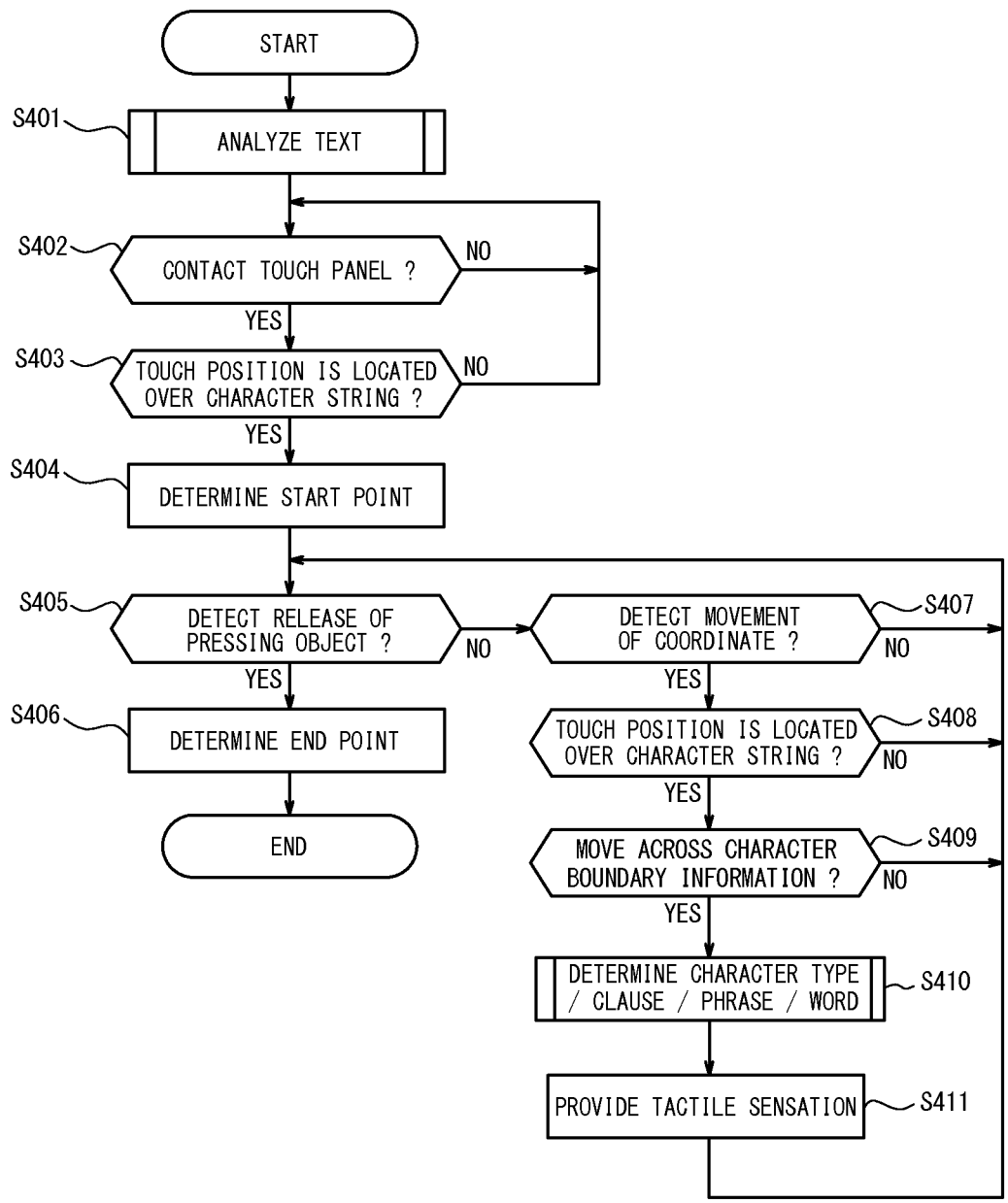
FIG. 22 is a flowchart illustrating an operation according to Example 6 and Example 7.

FIG. 22 is an example of a flowchart illustrating an operation according to Example 6 and Example 7. First, the text analysis unit 10 analyzes and divides the entire text in terms of the character type, the clause, the phrase and the word and stores the text in the memory unit 5 (S401). Next, the control unit 4 detects whether the pressing object (the user's finger A according to the present example) has contacted the touch panel unit 2 (S402). When the control unit 4 detects the contact to the touch panel unit 2 by the finger A (Yes), the text analysis unit 10 determines whether the contact position of the finger A is located over the character string displayed on the display unit 1 (S403). When the text analysis unit 10 determines that the contact position of the finger A is located over the character string (Yes), the area specifying unit 7 sets the character at the contact position of the finger A as the start point (S404). When the text analysis unit 10 determines that the contact position of the finger A is not located over the character string (No), the control unit 4 returns to S402 to detect contact to the touch panel by the finger A.

Next, the control unit 4 detects whether the finger A is released from the touch panel unit 2 (S405). When release of the finger A is detected (Yes), the area specifying unit 7 sets the end point of the selected area to the character being contacted by the finger A according to Example 6, or to the character being contacted by the finger A before the finger A moves across the character boundary information according to Example 7 (S406).

When the control unit 4 does not detect the release of the finger A at S405 (No), the control unit 4 determines whether the movement of the coordinate of the pressing object (movement of the finger A according to the present example) is detected (S407). When the movement of the finger A is detected (Yes), the text analysis unit 10 determines whether the finger A has moved to be located over the character string displayed on the display unit 1 (S408) and, when determining that the contact position of the finger A is located over the character string (Yes), detects whether the finger A has moved across the character boundary information (S409). When the finger A has moved across the character boundary information (Yes), the text analysis unit 10 determines the information such as the character type, the clause, the phrase and the word (S410). When the movement of the finger A is not detected at S407 (No), when the text analysis unit 10 determines that the contact position of the finger A is not located over the character string at S408 (No), or when the finger A has not moved across the character boundary information at S409 (No), the control unit 4 returns to S405 to detect release of the finger A. Further, the control unit 4 instructs the tactile sensation providing unit 3 based on the determination result at S410 to provide the tactile sensation (S411) and returns to S405 to detect release of the finger A.

EXAMPLE 8

FIG. 23 is a diagram illustrating the area selection operation according to Example 8 when the Japanese character string is displayed. According to Example 8, the control unit 4 preliminarily analyzes the structure of the text in the entire web page in terms of word and clause information such as the word and the clause. Then, when the finger A selects an area of the character string and the contact position of the finger A moves from a character to a next character of the displayed character string, the control unit 4 compares the word and clause information of each of the characters preliminarily analyzed. When each of the character has different word and clause information, the control unit 4 controls the tactile sensation providing unit 3 based on the word and clause information such that the tactile sensation is provided to the finger A via the touch panel unit 2. The end point of the selected area is set to the character for which the tactile sensation is provided immediately before detection of release. In detail, for the character string "Zenjuugyouin no Busshinryoumen no Kouhuku wo Tsuikyuu Suruto Douji ni," indicated on a first line in FIG. 23, the text analysis unit 10 of the control unit 4 inserts the word and clause information as indicated by "Zenjuugyouin no/Busshinryoumen no/Kouhuku wo/Tsuikyuu Suruto/Douji ni/," on a second line.

Then, when the finger A contacts the position corresponding to "Bu" as indicated on a third line and slides as indicated on a fourth line to trace "Busshinryoumen no Kou" as indicated on a fifth line, since the finger A moves across different word and clause information, the control unit 4 controls the tactile sensation providing unit 3 to provide the "throbbing" tactile sensation. When the finger A is released at this point, "Busshinryoumen no Kou" is determined as the selected area.

Figure 24:
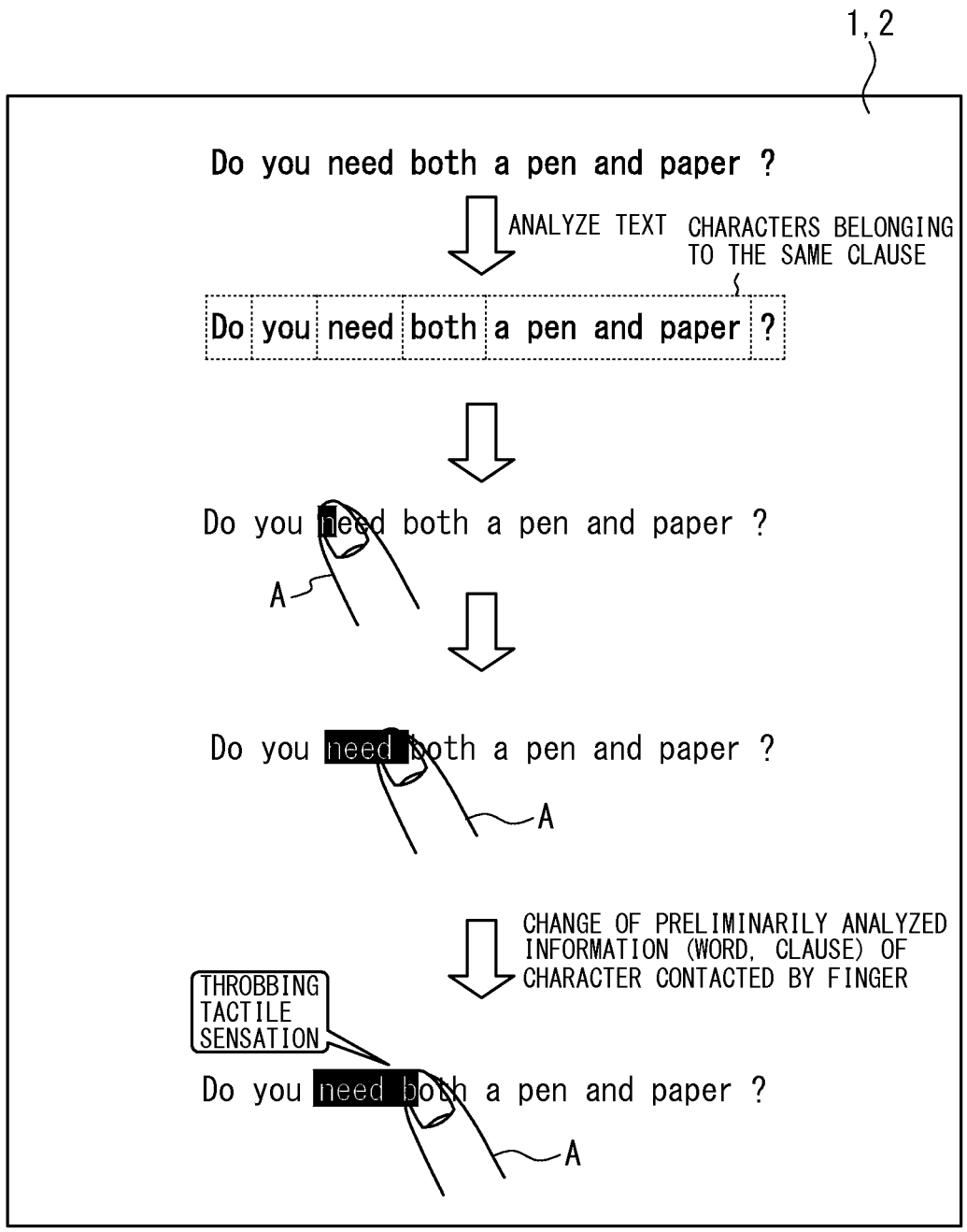
FIG. 24 is a diagram illustrating the area selection operation according to Example 8 when the English character string is displayed.

FIG. 24 is a diagram illustrating the area selection operation according to Example 8 when the English character string is displayed. For the character string "Do you need both a pen and paper?" indicated on a first line in FIG. 24, the text analysis unit 10 of the control unit 4 inserts the word and clause information as indicated by "Do/you/need/both/a pen and paper/?" on a second line. Then, when the finger A contacts the position corresponding to "n" as indicated on a third line and slide as indicated on a fourth line to trace "need b" as indicated on a fifth line, since the finger A moves across different word and clause information, the control unit 4 controls the tactile sensation providing unit 3 to provide the "throbbing" tactile sensation. When the finger A is released at this point, "need b" ("need", the "space" and "b") is determined as the selected area.

EXAMPLE 9

FIG. 25 is a diagram illustrating the area selection operation according to Example 9 when the Japanese character string is displayed. According to Example 9, although the control unit 4 selects an area of the character string in a manner similar to Example 8, the end point of the selected area is set to the character that is adjacent to the character string including the word and clause information of the character being contacted immediately before detection of release and having the word and clause information immediately before that of the character being contacted immediately before detection of the release. In detail, after an operation similar to that indicated from a first line to a fourth line in FIG. 23, when the finger A traces "Busshinryoumen no Kou" as indicated on a fifth line, since the finger A moves across different word and clause information, the control unit 4 controls the tactile sensation providing unit 3 to provide the "throbbing" tactile sensation. When the finger A is released at this point, "Busshinryoumen no" is determined as the selected area.

Figure 26:
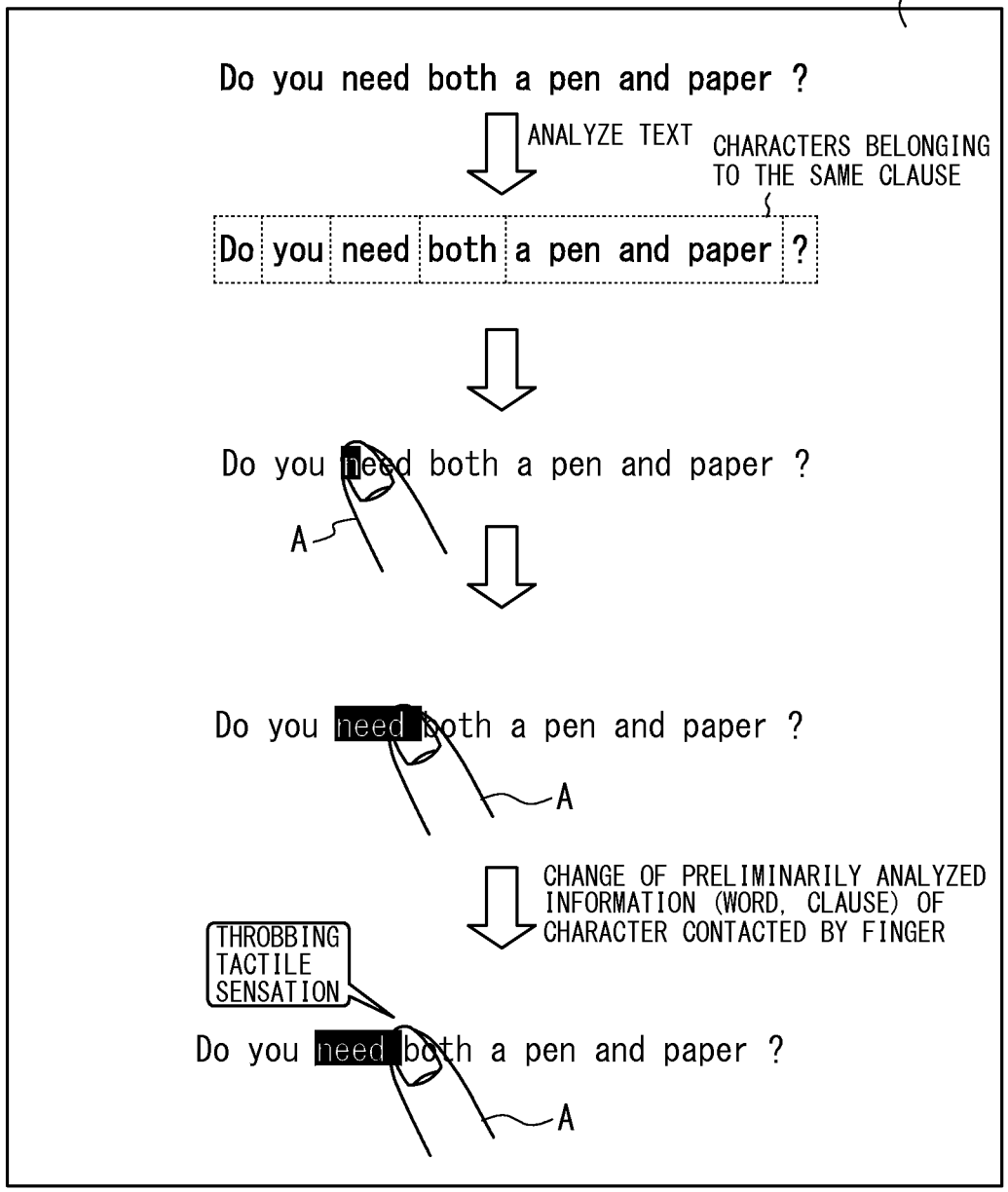
FIG. 26 is a diagram illustrating the area selection operation according to Example 9 when the English character string is displayed.

FIG. 26 is a diagram illustrating the area selection operation according to Example 9 when the English character string is displayed. After an operation similar to that indicated from a first line to a fourth line in FIG. 24, when the finger A traces "need b" as indicated on a fifth line, since the finger A moves across different word and clause information, the control unit 4 controls the tactile sensation providing unit 3 to provide the "throbbing" tactile sensation. When the finger A is released at this point, "need" ("need" and the "space") or "need" is determined as the selected area.

FIG. 27 is an example of a flowchart illustrating an operation according to Example 8 and Example 9. First, the text analysis unit 10 analyzes and divides the entire text in terms of the clause, the phrase and the word and stores the text in the memory unit 5 (S501). Next, the control unit 4 detects whether the pressing object (the user's finger A according to the present example) has contacted the touch panel unit 2 (S502). When the control unit 4 detects the contact to the touch panel unit 2 by the finger A (Yes), the text analysis unit 10 determines whether the contact position of the finger A is located over the character string displayed on the display unit 1 (S503). When determining that the contact position of the finger A is located over the character string (Yes), the text analysis unit 10 determines clause/phrase/word information of the character at the contact position of the finger A (S504). When the text analysis unit 10 determines that the contact position of the finger A is not located over the character string (No), the control unit 4 returns to S502 to detect contact to the touch panel by the finger A. Then, the control unit 4 stores the clause/phrase/word information determined at S504 in the character type storage unit 9 (S505), and the area specifying unit 7 sets the character used for determination at S504 as the start point of the selected area (S506).

Next, the control unit 4 determines whether the finger A is released from the touch panel unit 2 (S507). When release of the finger A is detected (Yes), the area specifying unit 7 sets the end point of the selected area to the character being contacted before detection of the release according to Example 8, or to the character that is adjacent to the character string including the word and clause information of the character being contacted immediately before detection of the release and having the word and clause information immediately before that of the character being contacted immediately before detection of the release according to Example 9 (S508).

When release is not detected (No), the control unit 4 determines whether the movement of the coordinate of the pressing object (movement of the finger A according to the present example) is detected (S509). When the movement of the finger A is detected (Yes), the character determination unit 6 determines whether the finger A moves to be located over the character string displayed on the display unit 1 (S510) and, when determining that the contact position of the finger A is located over the character string (Yes), determines the clause/phrase/word information of the character at the contact position of the finger A (S511). When the movement of the finger A is not detected at S509 (No), or when the character determination unit 6 determines at S510 that the contact position of the finger A is not located over the character string (No), the control unit 4 returns to S507 to detect release of the finger A.

Next, the control unit 4 determines whether the clause/phrase/word information stored in the character type storage unit 9 is the same as the clause/phrase/word information of the character determined at S511 (S512) and, when determining that the stored clause/phrase/word information is not the same as the clause/phrase/word information determined at S511 (No), instructs the tactile sensation providing unit 3 based on the determination result at S511 to provide the tactile sensation (S513). When determining that the stored clause/phrase/word information is the same as the clause/phrase/word information determined at S511 (Yes), the control unit 4 returns to S507 to detect release of the finger A. Further, the control unit 4 overwrites the clause/phrase/word information in the character type storage unit 9 with that determined at S511 (S514) and returns to S507 to detect release of the finger A.

According to the embodiment described above, when the area selection operation is performed by tracing the character string displayed on the display having the touch panel by using the finger, the selected area is displayed and the tactile sensation is provided to the finger pressing the touch panel. Therefore, even when the character is covered with the finger, the operator may know the start point and the end point of the selected area and, further, the segments of the selected area in terms of the character, the word and the clause. Accordingly, the user may easily select a desired area of the character string. Also, the above embodiment allows the user to select a relationship between a releasing timing and the end point of the selected area as described above, or to select a variety of tactile sensation patterns and methods to provide the tactile sensation patterns as described above, thereby improving usability for the user.

REFERENCE SIGNS LIST 1 display unit
2 touch panel unit
3 tactile sensation providing unit
4 control unit
5 memory unit
6 character determination unit
7 area specifying unit
8 character type and tactile sensation table
9 character type storage unit
10 text analysis unit

The invention claimed is:

1. A display apparatus comprising:
   a display unit configured to display information including a character string;
   a touch panel unit disposed in front of the display unit and configured to receive a contact operation by a pressing object to the character string displayed on the display unit;
   a tactile sensation providing unit configured to provide a tactile sensation to the pressing object contacting the touch panel unit; and
   a control unit configured to control the display unit, the touch panel unit and the tactile sensation providing unit, wherein
   the control unit includes:
   a character determination unit configured to determine, when it is determined that a contact position of the contact operation received by the touch panel unit is located on the character string that represents any one of the text, clause, phrase or the word displayed on the display unit, a character type of a character at the contact position; and
   an area specifying unit configured to specify an area of the character string by determining a start point and an end point on the character string based on the contact operation to the touch panel unit, and wherein
   the control unit, when the area specifying unit specifies the area of the character string by determining a start point and an end point on the character string, controls the tactile sensation providing unit based on a determination result obtained from the character determination unit.

2. The display apparatus according to claim 1, wherein the character type determined by the character determination unit is any of a double-byte Kanji character, a single-byte Kanji character, a double-byte Hiragana character, a single-byte Hiragana character, a double-byte Katakana character, a single-byte Katakana character, a double-byte alphabet, a single-byte alphabet, a double-byte digit, a single-byte digit, a double-byte symbol, a single-byte symbol, a pictograph, a punctuation mark, a space and a font (font style, italic, bold, font size, font color, background color, effect and underline), the display apparatus comprises a memory unit configured to store a different tactile sensation pattern for each of the character type, and the control unit instructs the tactile sensation providing unit to provide the tactile sensation based on the tactile sensation pattern corresponding to the character type determined by the character determination unit stored in the memory unit.

3. The display apparatus according to claim 1, wherein the control unit instructs the tactile sensation providing unit to provide the tactile sensation when the character determination unit detects one character.

4. The display apparatus according to claim 1, wherein the control unit instructs the tactile sensation providing unit to provide the tactile sensation when the character determination unit determines a different character type.

5. A display apparatus comprising:
a display unit configured to display information including a character string;
a touch panel unit disposed in front of the display unit and configured to receive a contact operation by a pressing object to the character string that represents any one of the text, clause, phrase or the word displayed on the display unit;
a tactile sensation providing unit configured to provide a tactile sensation to the pressing object contacting the touch panel unit; and
a control unit configured to control the display unit, the touch panel unit and the tactile sensation providing unit, wherein the control unit includes:
a text analysis unit configured to analyze a structure of the character string and to divide the character string displayed on the display unit at a contact position of the contact operation received by the touch panel unit, according to a word, a phrase, a clause or a character type; and
an area specifying unit configured to specify an area of the character string by determining a start point and an end point on the character string based on the contact operation to the touch panel unit, and wherein
the control unit, when the area specifying unit specifies the area of the character string by determining a start point and an end point on the character string, controls the tactile sensation providing unit based on a segment obtained from the text analysis unit.

6. The display apparatus according to claim 5, wherein the control unit instructs the tactile sensation providing unit to provide the tactile sensation when the contact position on the touch panel moves to a different segment divided by the text analysis unit.

7. The display apparatus according to claim 5, wherein the control unit instructs the tactile sensation providing unit to provide the tactile sensation when the contact position on the touch panel is located over a last character in the segment divided by the text analysis unit.

8. The display apparatus according to claim 5, comprising a memory unit configured to store different tactile sensation patterns, wherein the control unit instructs the tactile sensation providing unit, when the contact position on the touch panel unit moves to a different segment divided by the text analysis unit, or when the contact position is located over the last character in the segment divided by the text analysis unit, to provide a tactile sensation different at least from that for adjacent segments based on the tactile sensation patterns stored in the memory unit.

\* \* \* \* \*